United States Patent
Wakabayashi et al.

[11] Patent Number: 6,144,675
[45] Date of Patent: Nov. 7, 2000

[54] CLOCK REGENERATION APPARATUS FOR SYNCHRONOUS DATA TRANSMISSION

[75] Inventors: Jun Wakabayashi, Yokohama; Kazuhiko Shiba, Kawasaki, both of Japan

[73] Assignee: Fujitsu Limited, Kawasaki, Japan

[21] Appl. No.: 09/109,845

[22] Filed: Jul. 2, 1998

[30] Foreign Application Priority Data

Feb. 10, 1998 [JP] Japan ................................. 10-028848

[51] Int. Cl.⁷ ........................................................ H04J 3/06
[52] U.S. Cl. ........................ 370/516; 370/217; 370/226
[58] Field of Search ................................... 370/503, 217, 370/226

[56] References Cited

U.S. PATENT DOCUMENTS

| | | | |
|---|---|---|---|
| 4,937,811 | 6/1990 | Harris | 370/200 |
| 5,206,857 | 4/1993 | Farleigh | 370/452 |
| 5,499,275 | 3/1996 | Kishi | 375/357 |
| 5,935,214 | 8/1999 | Stiegler et al. | 709/238 |

FOREIGN PATENT DOCUMENTS

| | | |
|---|---|---|
| 514383 | 1/1993 | Japan . |
| 5227184 | 9/1993 | Japan . |
| 5252180 | 9/1993 | Japan . |

*Primary Examiner*—Huy D. Vu
*Assistant Examiner*—Dung Trinh
*Attorney, Agent, or Firm*—Helfgott & Karas, P.C.

[57] ABSTRACT

A clock regeneration apparatus which regenerates and distributes a timing signal in a synchronous data transmission network. The network is organized by a plurality of transmission units being linked in a ring topology, and at least two transmission units have external clock sources for synchronization purposes. The clock regeneration apparatus, disposed in each transmission unit, has a clock source list that contains entries for at least two line clock sources provided from neighboring transmission units. A clock selection controller selects a reference clock source with which the transmission unit is to be synchronized. A clock quality transmitter supplies one of the two neighboring transmission units that is not selected as the reference clock source by the clock source selection controller, with a message requesting not to use a corresponding line clock source for synchronization. This message transmission occurs only when the transmission unit is configured as a slave unit, and when the clock quality messages received from the neighboring transmission units exhibit equal clock quality levels continually for a predetermined period.

4 Claims, 21 Drawing Sheets

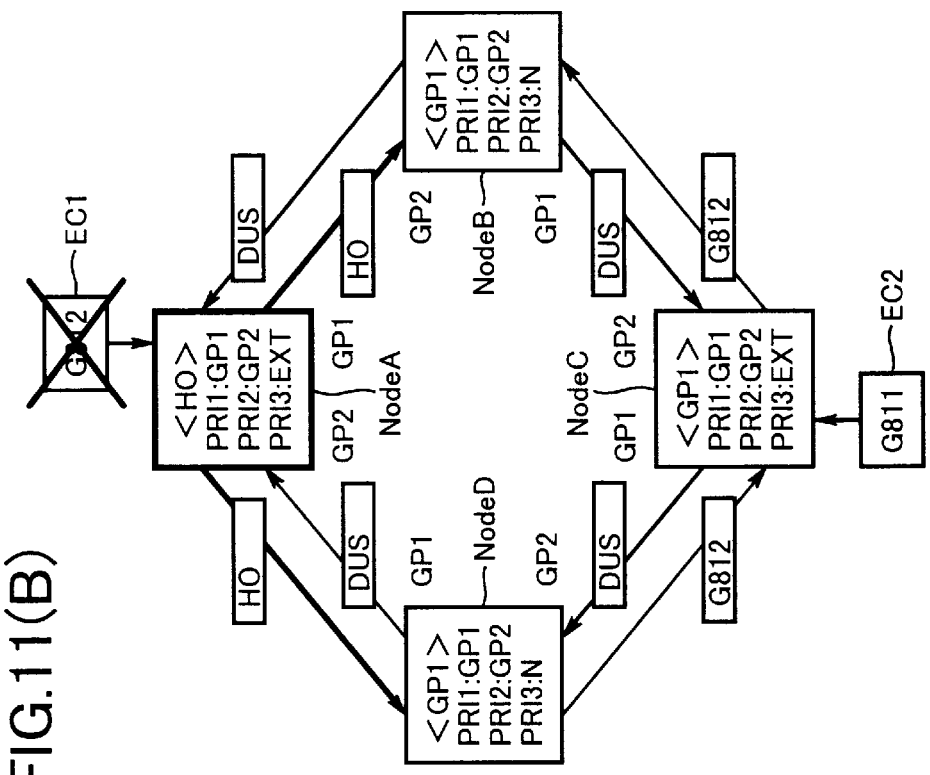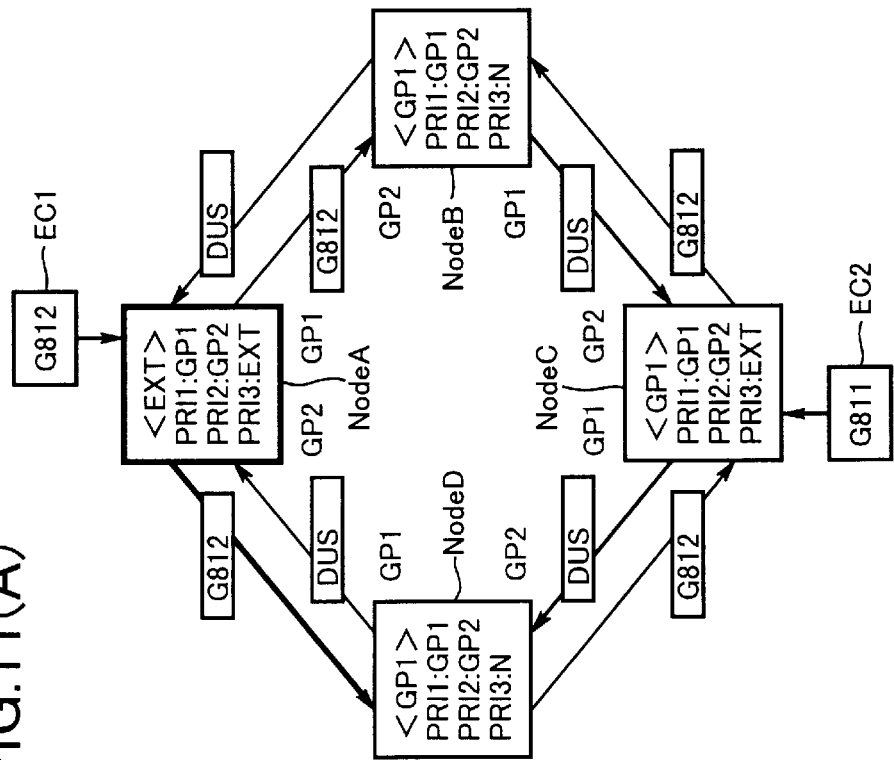
FIG.11(A)
FIG.11(B)

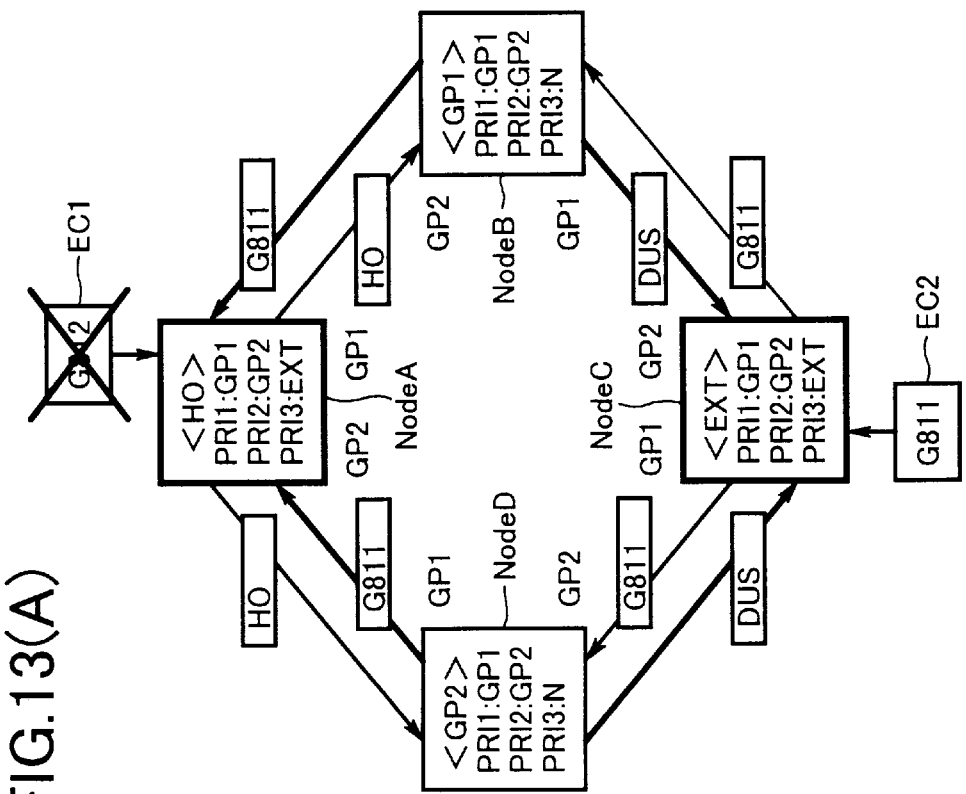
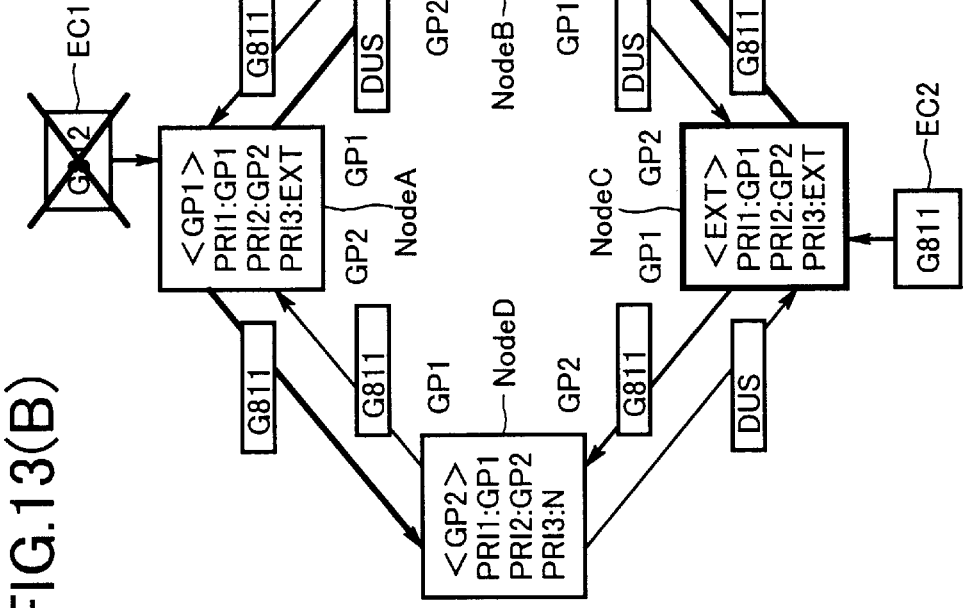
FIG.13(A)
FIG.13(B)

CLOCK REGENERATION APPARATUS FOR SYNCHRONOUS DATA TRANSMISSION

BACKGROUND OF THE INVENTION

1. Field of the Invention

The present invention relates to a clock regeneration apparatus, and more particularly to a clock regeneration apparatus disposed in each transmission unit for regenerating and distributing a timing signal for a data transmission network that is organized by a plurality of transmission units linked in a ring topology, together with external clock sources locally connected to at least two transmission units.

2. Description of the Related Art

In a synchronous network interconnecting a plurality of transmission units (or nodes) in a ring topology, it is required for all the units to operate in synchronization with a common reference clock signal. To this end, an appropriate synchronization distribution mechanism has to be incorporated in the system. Furthermore, to improve the reliability of clock timing distribution, the network often employs two or more clock signal generators connected to separate transmission units. Although a plurality of clock sources are prepared, the network system actually uses only one source at a time in normal situations, while leaving the others as backup sources. To allow the transmission units in the network to choose a correct clock source, some messages are distributed to indicate the quality status of the clock signal being used. Each transmission unit uses these messages, together with a list of available clock sources, to make an appropriate selection, so that the overall system will operate in synchronization with a common clock source.

FIG. 17 shows an example of a conventional ring network, where four transmission units 101 to 104 are linked by optical link cables in a ring topology. Note here that the network has two rings running in opposite directions. In the system of FIG. 17, two external clock sources 105 and 106 are connected to the transmission units 101 and 103, respectively, to supply clock signals having a quality level of G811.

The text strings shown in each box of the transmission units 101 to 104 indicate a "selected clock source" and a "clock source list." The "selected clock source," which is enclosed in angle brackets (e.g., <EXT>), shows a particular clock source that the transmission unit has selected as its timing reference for data transmission (as will be described later). The "clock source list" provides a list of potential clock sources with priorities, allowing each transmission unit to select an appropriate timing reference. More specifically, a symbol "PRI1" denotes the highest priority, while another symbol "PRI3" the lowest. Still another symbol "EXT" represents an external clock source that is local to the transmission unit. Symbols "GP1" and "GP2" are used to distinguish between two optical link cables extending from each transmission unit to its adjacent transmission units. When viewed from a transmission unit, the optical link cable on one side is called "GP1 line," while the same on the other side is called "GP2 line." As an alternative interpretation, these "GP1" and "GP2" can be understood as the labels of interface ports of a transmission unit, rather than those of optical link cables. In FIG. 17, symbols "G811" and "DUS" are placed on the individual optical link cables interconnecting the transmission units 101 to 104, which represent messages indicating the quality levels of clock signals being delivered over the cables. The DUS ("Don't Use for Sync") messages inhibit the downstream transmission units from using that line clock source for synchronization.

FIG. 17 illustrates a normal situation where both external clock sources 105 and 106 are functioning correctly. The transmission unit 101 selects the external clock source 105 as the synchronization reference signal, since its internal clock source list gives the highest priority to an external clock source (EXT) local to the unit. Other transmission units 102, 103, and 104 select line clock sources provided from their respective GP1 lines, according to their own clock source lists. As a result, all the transmission units 101 to 104 are timed by the external clock source 105.

Referring now to FIG. 18, the following section will present how the network of FIG. 17 behaves when the external clock source 105 has failed. FIG. 18 shows the synchronization distribution path over which the clock signals propagate in such a fault situation. Now that the external clock source 105 is inoperative, the transmission unit 103 selects the other external clock source 106 as the alternative source for synchronization reference. The transmission units 101 and 104 select their respective GP2 lines, and the transmission unit 102 its GP1 line, in accordance with their individual clock source lists. Finally, a new synchronization distribution path is established as indicated by the bold arrows in FIG. 18, where every transmission unit is timed by the new external clock source 106. In this way, the network gains an improved reliability of timing synchronization by employing a plurality of external clock sources.

The above-described conventional network, however, has such a drawback that the consistency in the synchronization timing would be lost when some problem occurred in a link between two transmission units. That is, it can potentially happen that some transmission units synchronize themselves with one external clock source, while other units synchronize themselves with another source. More specifically, FIG. 19 shows a specific fault situation where the link between the transmission units 101 and 104 is disrupted, while both external clocks have no problems. Being unable to receive clock signals from the transmission unit 101 via the transmission unit 104, the transmission unit 103 selects the external clock source 106 according to its own clock source list. Consequently, the transmission units 102 and 104 become synchronized with the external clock source 106. The transmission unit 101, however, still selects its external clock source 105, because the entry "EXT" has the highest selection priority. In this way, a link failure can cause an undesired condition where the transmission units within a network are synchronized not with a single common clock source, but with two different sources.

FIG. 20 shows still another fault situation where the external clock source 105 is inoperative, and the link between the transmission units 103 and 104 has encountered a problem. Since the external clock source 105 is lost, the network attempts to reconfigure itself to use the external clock source 106 for synchronization distribution as shown in FIG. 18. However, a subsequent link failure between the transmission units 103 and 104 disables the provision of a clock signal from the transmission unit 103 to the next transmission unit 104. Now that the transmission unit 104 has no clock sources to trace, it enters another timing mode in which its internal clock signal is locked as is. This is known as a "holdover" mode, and the outgoing clock signal in this mode (i.e., "holdover" clock) is represented by a symbol "HO" in FIG. 20. The transmission unit 101 then selects the line clock source GP2 for synchronization, in accordance with its own clock source list. In this way, the network falls into an inconsistent situation in term of the clock source selection. That is, the transmission units within a network operate in synchronization not with a single common clock source, but with two separate sources.

The above undesired situation may be avoided by making the clock source list of the transmission unit 101 include both entries of "GP1" and "GP2." This setup, however, has a side effect described as follows.

FIG. 21 illustrates a network configuration where both "GP1" and "GP2" are registered in the clock source list of the transmission unit 101. More specifically, the clock source list has three entries "EXT," "GP1," and "GP2" with successively lower priorities. This setup allows all the transmission units to be timed by the external clock source 105, as long as the source 105 operates correctly. However, a problem with the external clock source 105 would lead to a closed loop of synchronization distribution, as shown in FIG. 21, where all the transmission units selects their respective "GP1" line clocks. This explains why the transmission unit 101 is allowed to contain not both of, but only one of the GP1 and GP2 line timing sources in its clock source list.

SUMMARY OF THE INVENTION

Taking the above into consideration, an object of the present invention is to provide a clock regeneration apparatus disposed in each transmission unit to support timing signal distribution in a ring-shaped synchronous data transmission network with a plurality of external clock sources, being designed to maintain the timing synchronization of all transmission units in the network with a single external clock source, even in a fault situation where a link between transmission units is disrupted.

To accomplish the above object, according to the present invention, there is provided a clock regeneration apparatus for regenerating and distributing a clock signal in a data transmission network that is organized by a plurality of transmission units linked in a ring topology. Here, at least two transmission units have an external clock source that is locally connected to them, and the plurality of transmission units include a first transmission unit, and a second and third transmission units neighboring the first transmission unit.

This clock regeneration apparatus, being disposed in the first transmission unit, comprises the following elements:

(a) A clock source list memory which stores a clock source list containing entries for a plurality of clock sources out of which the first transmission unit can select a reference clock source for synchronization. The clock sources, having different priority levels for the above selection, include at least two line clock sources provided from the second and third transmission units.

(b) A master/slave data memory which stores a master/slave mode flag indicating whether the first transmission unit serves as a master transmission unit that supplies the clock signal to the network or acting as a slave transmission unit that is supplied with the clock signal from the master transmission unit.

(c) A clock selection controller which selects, from among the plurality of clock sources, a reference clock source with which the first transmission unit is to be synchronized, based on the clock source list, the master/slave mode flag stored in the master/slave data memory, and clock quality messages that the first transmission unit have received from the second and third transmission units.

(d) A clock quality transmitter for supplying either one of the second and third transmission units that is not selected as the reference clock source by the clock source selection controller, with a message requesting not to use a corresponding line clock source for synchronization. This message is transmitted if the master/slave mode flag stored in the master/slave data memory indicates that the first transmission unit is acting as a slave transmission unit, and if the clock quality messages received from the second and third transmission units exhibit equal clock quality levels continually for a predetermined period.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11(A) is a diagram showing a normal situation where the network has no problems and all transmission units, or node A to D, have been synchronized with a clock source EC1 of node A;

FIG. 11(B) is a diagram showing how the node A will behave when the external clock source EC1 has failed;

FIG. 13(A) is a diagram showing how the node B and node D will behave after the node C has worked as shown in FIG. 12(B);

FIG. 13(B) is a diagram showing how the node A will behave after the node B and node D have worked as shown in FIG. 13(A);

DESCRIPTION OF THE PREFERRED EMBODIMENTS

Two embodiments of the present invention will be described below with reference to the accompanying drawings.

Figure 1:
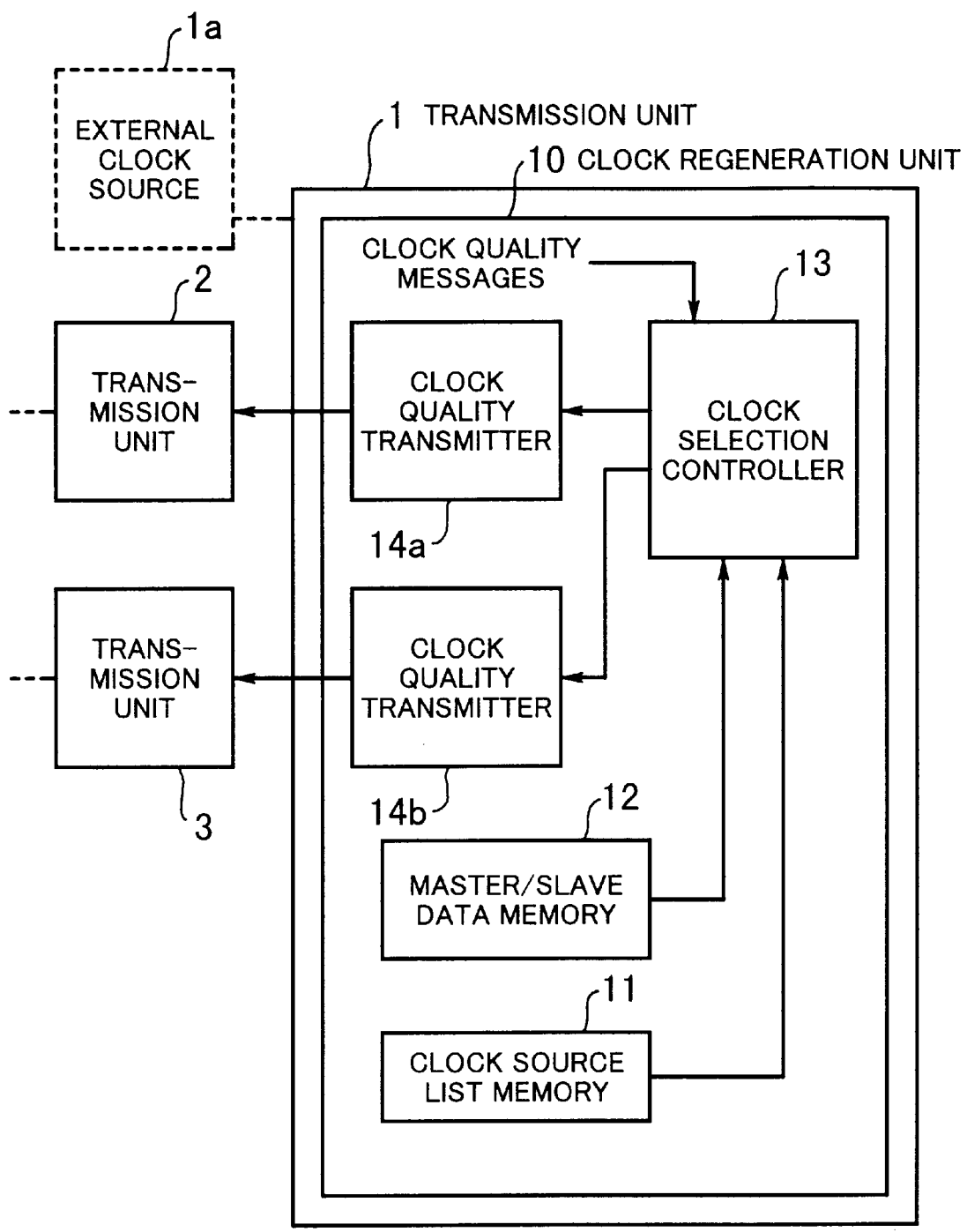
FIG. 1 is a conceptual view of the present invention.

Referring first to FIG. 1, the following will present the concept of a first embodiment of the present invention. FIG. 1 illustrates part of a ring network, where a transmission unit 1 represents one node, and two transmission units 2 and 3 are nodes neighboring the transmission unit 1. The transmission unit 1 has a clock regeneration unit 10, which comprises the following elements:

(a) A clock source list memory 11 which stores a clock source list containing entries for a plurality of clock sources out of which the transmission unit 1 can select a reference clock source for synchronization purposes. The clock sources, having different priority levels for clock selection criteria, include at least two line clock sources provided from the neighboring transmission units 2 and 3.

(b) A master/slave data memory 12 which stores a master/slave mode flag indicating whether the transmission unit 1 serves as a master transmission unit that supplies the clock signal to the network, or acts as a slave transmission unit that is supplied with the clock signal from the master transmission unit.

(c) A clock selection controller 13 which selects, from among the plurality of clock sources, a reference clock source with which the transmission unit 1 is to be synchronized. This selection is made on the basis of the clock source list, the master/slave mode flag stored in the master/slave data memory 12, and clock quality messages that the transmission unit 1 has received from the neighboring transmission units 2 and 3.

(d) Clock quality transmitters 14a and 14b which supply either one of the second and third transmission units that is not selected as the reference clock source by the clock selection controller 13, with a message requesting not to use a corresponding line clock source for synchronization. This message is transmitted if the master/slave mode flag stored in the master/slave data memory 12 indicates that the transmission unit 1 is acting as a slave transmission unit, and if the clock quality messages received from the transmission units 2 and 3 exhibit equal clock quality levels continually for a predetermined period.

Here, an external clock source 1a may optionally be connected to the transmission unit 1. That is, some transmission units in the network can receive clock signals directly from external clock sources local to them, while the others receive clock signals only from line clock sources.

In the structural arrangement described above, the clock source list has to be formulated in such a way that its entries will include, as potential clock sources, both of the two transmission units 2 and 3 neighboring the transmission unit 1. This setup ensures that all the transmission units will operate in synchronization with a single external clock source, even if a link failure between transmission units occurs. To eliminate the possibility of forming a closed timing loop, the clock regeneration unit 10 of the present invention employs some special features as described below.

In the proposed mechanism for clock synchronization, the master/slave data memory 12 holds a mode flag that determines whether the transmission unit 1 serves as a master unit or acts as a slave unit. Specifically, this master/slave mode flag defines the operation mode of the clock selection controller 13 and the clock quality transmitters 14a and 14b. Based on the clock source list in the clock source list memory 11, the master/slave mode flag in the master/slave data memory 12, and incoming clock quality messages, the clock selection controller 13 selects an appropriate clock source that the transmission unit 1 should track. This selection establishes synchronization so that all the transmission units in the network will follow a single external clock source.

By the action of the clock selection controller 13 in each transmission unit, the timing synchronization is carried out in a sequential manner, from the master transmission unit to the slave transmission units in one direction along the ring. A synchronization distribution path is finally established when this process reaches a slave unit at the terminal location, i.e., the location just before the master unit. In conventional networks, this terminal slave unit sends a clock quality message to the master unit to show the validity of the reference clock source being used. Therefore, when the selected external clock source encounters a problem, the master unit will attempt to select that line clock signal provided from the terminal slave unit, thus resulting in a closed timing loop.

The present invention avoids the above problem by incorporating a special mechanism into the clock quality transmitters 14a and 14b. That is, the clock quality transmitters 14a and 14b are designed to send a DUS message to a neighboring transmission unit to request not to select that line clock signal as a reference clock source for synchronization. This DUS message is generated when the following two conditions are both satisfied: (1) the master/slave mode flag in the master/slave data storage unit 12 indicates that the transmission unit 1 is acting as a slave unit, and (2) clock quality messages received from the two neighboring transmission units 2 and 3 exhibit equal clock quality levels continually for a predetermined period. When these conditions are met, the transmission unit 1 sends a DUS message to one of the two neighboring transmission units 2 and 3 that is not selected as the reference clock source, through either one of the two clock quality transmitters 14a and 14b. Because this feature allows the terminal slave transmission unit to provide the master transmission unit not with a G811 message, but with a DUS message, the master transmission unit will not select the line clock from the terminal slave transmission unit even if the external clock source has failed. In this way, the present invention prevents the synchronization distribution path from forming a closed loop.

Now, the following section will describe the first embodiment of the present invention in more detail. Note that the functional units explained in FIG. 1 are renumbered and/or renamed in the detailed block diagram of FIG. 3. More specifically, the units in FIG. 1 correspond to those in FIG. 3 as follows: the clock source list memory 11 (FIG. 1) to a clock source list memory 34 (FIG. 3); the master/slave data memory 12 to a master/slave data memory 33; the clock selection controller 13 to a clock selection controller 29; the clock quality transmitter 14a to a GP1 line clock quality transmitter 25; and the clock quality transmitter 14b to a GP2 line clock quality transmitter 28.

Figure 2:
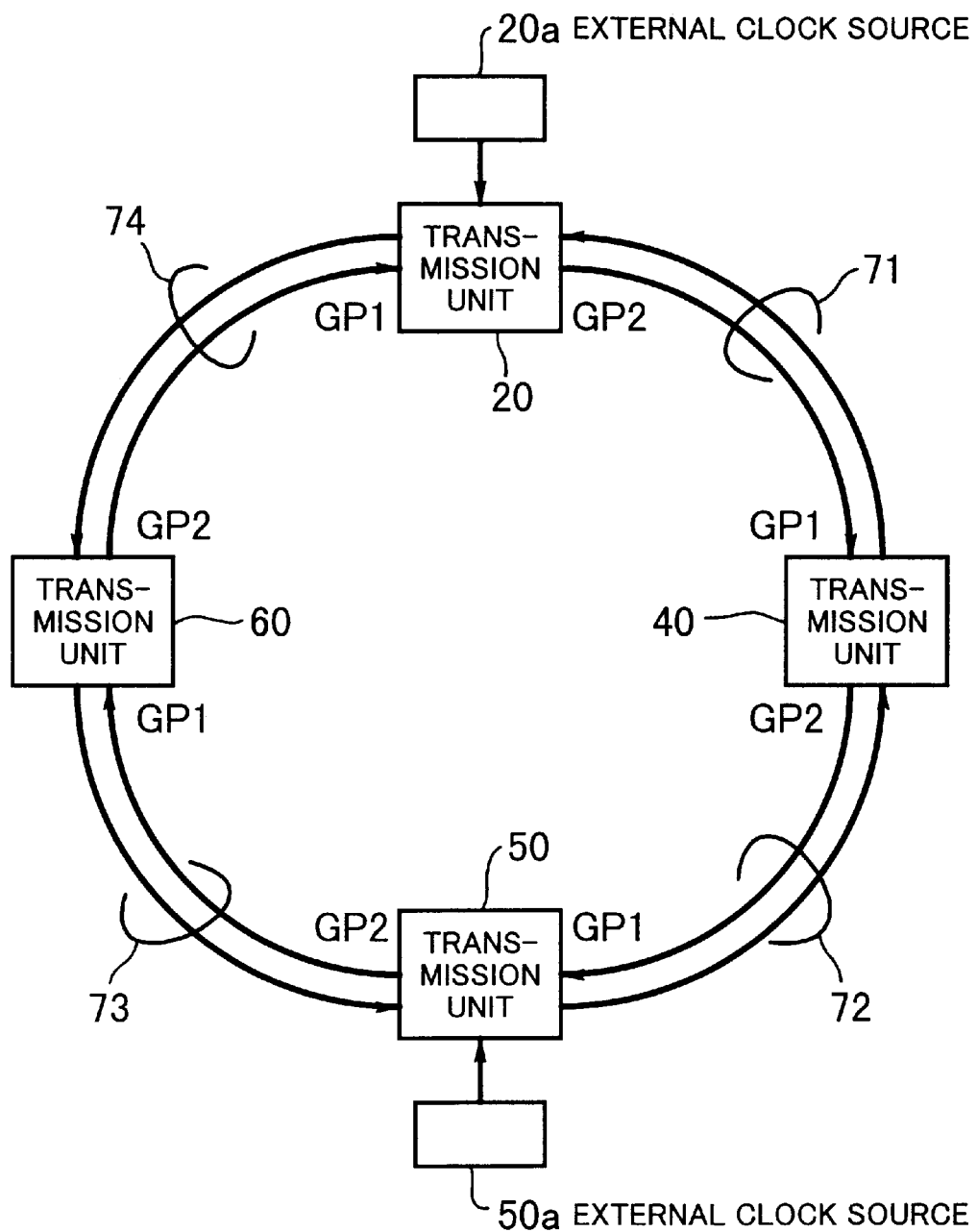
FIG. 2 is a diagram which shows the general view of a transmission network where the present invention is implemented.

FIG. 2 shows the general view of a transmission network where the present invention is embodied. Here, transmission units 20, 40, 50, and 60 are linked in a ring topology by optical link cables 71 to 74. Two external clock sources 20a and 50a supply reference clock signals to the transmission units 20 and 50, respectively. The transmission units 20, 40, 50, and 60 are each equipped with two optical link interface ports to transmit and receive optical signals to/from two neighboring transmission units. Each transmission unit refers to its two interface ports (or optical link cables connected to them) as lines "GP1" and "GP2." There is a naming convention that one transmission unit's GP1 line is always in combination with another transmission unit's GP2 line, as FIG. 2 shows.

Figure 3:
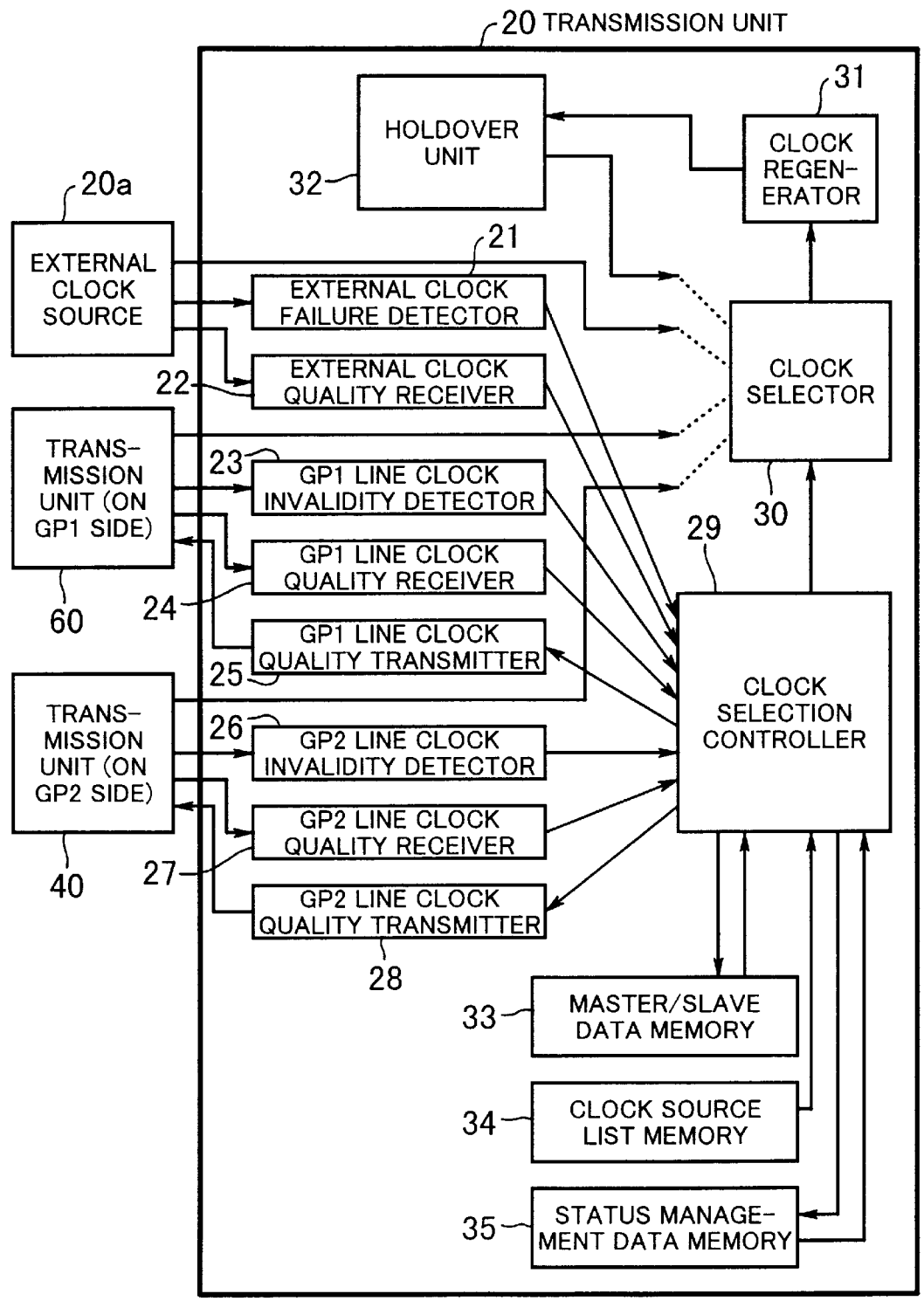
FIG. 3 is a diagram which shows the internal structure of a transmission unit.

FIG. 3 shows the internal structure of the transmission unit 20. Here, an external clock source 20a generates a reference clock signal and assembles a transmission frame that contains the generated clock signal in its payload field and a clock quality message in its header field. Such frames are supplied to the transmission unit 20. The transmission unit 20 has an external clock failure detector 21 to find errors that may be contained in the reference clock signal sent from the external clock source 20a, and it sends the detection results to a clock selection controller 29. An external clock quality receiver 22 receives clock quality messages from the external clock source 20a and supplies them to the clock selection controller 29. The reference clock signal received from the external clock source 20a is fed to a clock selector 30.

The transmission unit 20 receives clock quality messages from the neighboring transmission unit 60 through its GP1 line. When the messages are found invalid due to some problem with the GP1 line or the like, a GP1 line clock invalidity detector 23 notifies the clock selection controller 29 of the invalidity. A GP1 line clock quality receiver 24 receives clock quality messages from the transmission unit 60 through the GP1 line and supplies the information to the clock selection controller 29. A GP1 line clock quality transmitter 25, on the other hand, sends clock quality messages to the transmission unit 60 through the GP1 line, inserting necessary information to the header of transmission frames. A clock signal received from the transmission unit 60 is fed to the clock selector 30.

Similarly, the transmission unit 20 receives clock quality messages from the other neighboring transmission unit 40 through its GP2 line. When the messages are found invalid due to some problem with the GP2 line or the like, a GP2 line clock invalidity detector 26 notifies the clock selection controller 29 of the invalidity. A GP2 line clock quality receiver 27 receives clock quality messages from the transmission unit 40 through the GP2 line and supplies the information to the clock selection controller 29. A GP2 line clock quality transmitter 28 sends clock quality messages to the transmission unit 40 through the GP2 line, inserting necessary information to the header of transmission frames. The clock signal supplied from the transmission unit 40 is fed to the clock selector 30.

Based on the data supplied as above, together with other data in its local storage units 33 to 35 (described later), the clock selection controller 29 determines which reference clock source the transmission unit 20 should use for synchronization. According to this decision, it commands the clock selector 30 to select the right clock source. The clock selection controller 29 further controls the transmission of clock quality messages to the neighboring transmission units 40 and 60. Such features of the clock selection controller 29 can be implemented as firmware functions of an appropriate data processing unit, the detailed processes of which will be described later with reference to FIGS. 4 to 10.

In accordance with the selection command given by the clock selection controller 29, the clock selector 30 selects one of the available reference clock sources, thereby providing the selected clock signal to a clock regenerator 31. The clock regenerator 31 regenerates a clock signal in synchronization with the reference clock signal sent from the clock selector 30. The regenerated clock is distributed to other functional units within the transmission unit 20. When there are no other clock sources are available for synchronization, a holdover unit 32 maintains, or locks, the present state of the clock signal that has been produced by the clock regenerator 31 so far. The output of the holdover unit 32 is fed to the clock selector 30 as one of the reference clock source inputs.

A master/slave data memory 33 keeps a flag that indicates whether the transmission unit 20 is a master transmission unit (i.e., the original distributor of the reference clock signal) or a slave transmission unit (i.e., a recipient of the reference clock signal). The decision of this master/slave setup is made by the clock selection controller 29, and the result is sent to the master/slave data memory 33 for storage. A clock source list memory 34 stores a prioritized list of reference clock sources that are available for selection by the transmission unit 20. While the contents of this clock source list may vary from one transmission unit to another, the transmission unit 20's clock source list contains the following three entries: GP1 with the highest priority (PRI1), GP2 with the second priority (PRI2), and EXT (external clock source) with the lowest priority (PRI3).

The transmission unit 20 further employs a status management data memory 35 to store various status information concerning the clock synchronization. This information includes: the name of the reference clock source that the transmission unit 20 is currently using for synchronization, the quality level of that reference clock signal, the availability status of other clock sources, and clock quality messages transmitted and/or received.

Another transmission unit 50 shown in FIG. 2 has the same structure as the transmission unit 20 discussed in FIG. 3. The contents of its clock source list is also the same as the transmission unit 20's. The other transmission units 40 and 60 are similar to the transmission unit 20; they have most of the functional elements shown in FIG. 3, excluding the external clock source 20a, the external clock failure detector 21, and the external clock quality receiver 22. In their clock source lists, however, the lowest priority (PRI3) entry is left blank (N), while the highest priority (PRI1) and second priority (PRI2) entries contain GP1 and GP2 lines, respectively, as in the list of the transmission unit 20.

Now, the following section will present how the clock selection controller 29 operates specifically in the first embodiment. Note, however, that the explanation applies not only to the clock selection controller 29 in the transmission unit 20, but also to those in the other transmission units 40, 50, and 60.

Figure 4:
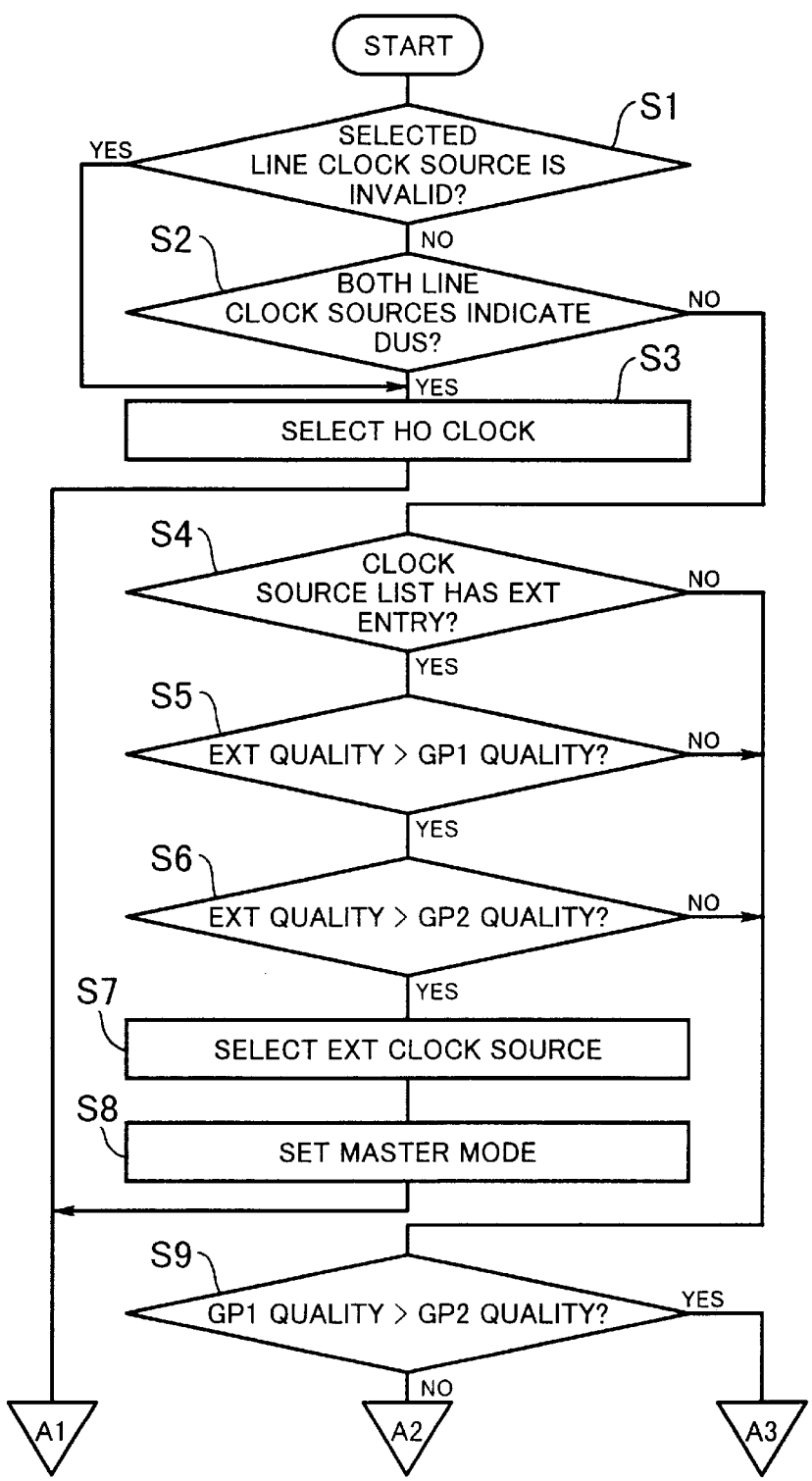
FIGS. 4 and 5 are the first and second halves of a flowchart which shows how the clock selection controller in a slave transmission unit selects a reference clock source.
Figure 5:
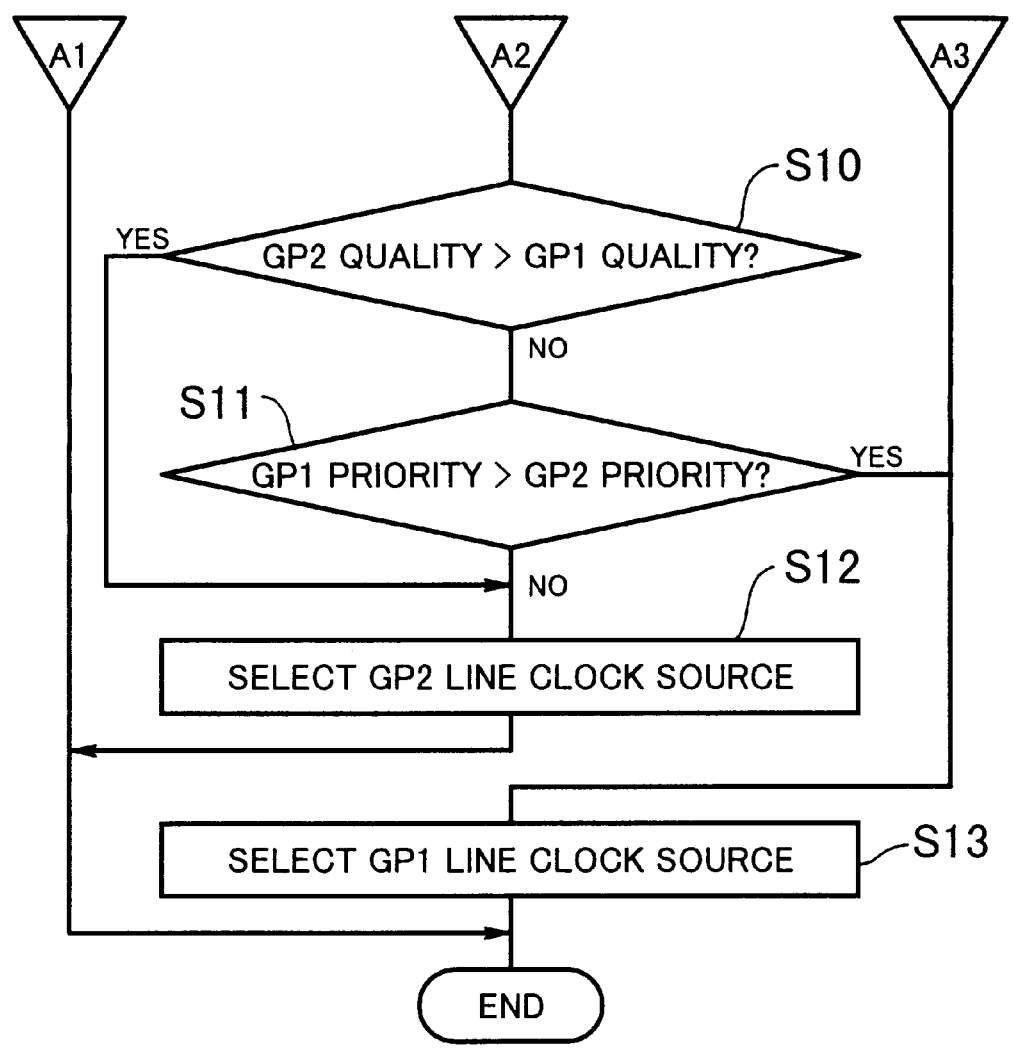

FIGS. 4 and 5 are the first and second halves of a flowchart showing a clock selection process executed by the clock selection controller in each slave transmission unit. Note that this clock selection process is executed repetitively at predetermined intervals. The following explanation will follow the order of step numbers (S1 to S13) shown in FIGS. 4 and 5.

(S1) Examining a clock quality message received from the line being selected, the clock selection controller judges the validity of the present reference clock source. If the present source is found invalid, the process skips to step S3. Otherwise, it proceeds to the step S2.

(S2) The clock selection controller receives clock quality messages from both lines, GP1 and GP2, and it judges whether the both messages indicate "Don't Use for Sync" (DUS). If the both lines are in DUS condition, the process advances to step S3. If either GP1 or GP2 line is valid, the process branches to step S4.

(S3) Now that the transmission unit has lost all clock sources for synchronization reference, the clock selection controller selects its local "holdover" (HO) clock. This means that the present state of the clock signal that has been used so far is kept intact.

(S4) The clock selection controller tests whether an external clock source (EXT) is registered in the clock source list. If the list has such an entry, the process advances to step S5. Otherwise, the process branches to step S9.

(S5) The clock selection controller judges whether the quality of the registered external clock source is higher than the quality indicated by the clock quality message received from the GP1 line. If the former is higher than the latter, the process advances to step S6. If not, the process branches to step S9.

(S6) The clock selection controller then judges whether the quality of the registered external clock source is higher than the quality indicated by the clock quality message received from the GP2 line. If the former is higher than the latter, the process advances to step S7. If not, the process branches to step S9.

(S7) The clock selection controller chooses the registered external clock source as a new reference clock source (master clock).

(S8) The clock selection controller modify the master/slave mode flag to configure the transmission unit as a mater transmission unit; i.e., it sets a master mode.

(S9) Examining the clock quality messages received from the GP1 and GP2 lines, the clock selection controller judges whether the clock quality level of the GP1 line is higher than that of the GP2 line. If the GP1s quality is higher than the GP2's, the process branches to step S13, and if it is not, the process advances to step S10.

(S10) Examining the clock quality messages received from the GP1 and GP2 lines, the clock selection controller judges whether the clock quality level of the GP2 line is higher than that of the GP1 line. If the GP2's quality is higher than the GP1's, the process skips to step S12. Otherwise, the process advances to step S11.

(S11) The clock selection controller examines the clock source list to determine whether the priority level of the GP1 line is higher than that of the GP2 line. If the GP1's priority level is higher than the GP2's, the process skips to step S13. Otherwise, the process advances to step S12.

(S12) The clock selection controller chooses the GP2 line clock source as a new reference clock source (master clock).

(S13) The clock selection controller chooses the GP1 line clock source as a new reference clock source (master clock).

Figure 6:
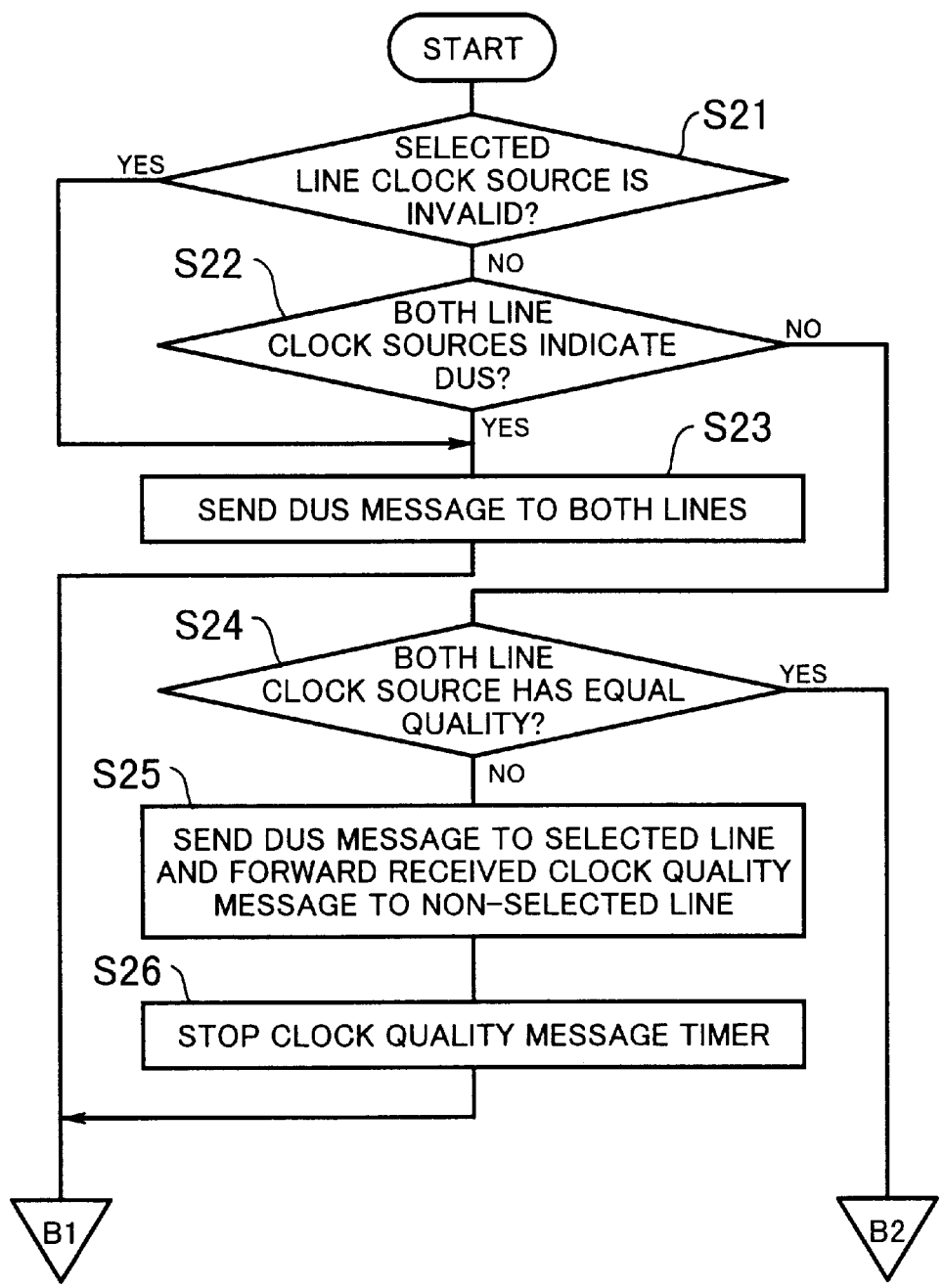
FIGS. 6 and 7 are the first and second halves of a flowchart which shows how the clock selection controller in a slave transmission unit transmits clock quality messages.
Figure 7:
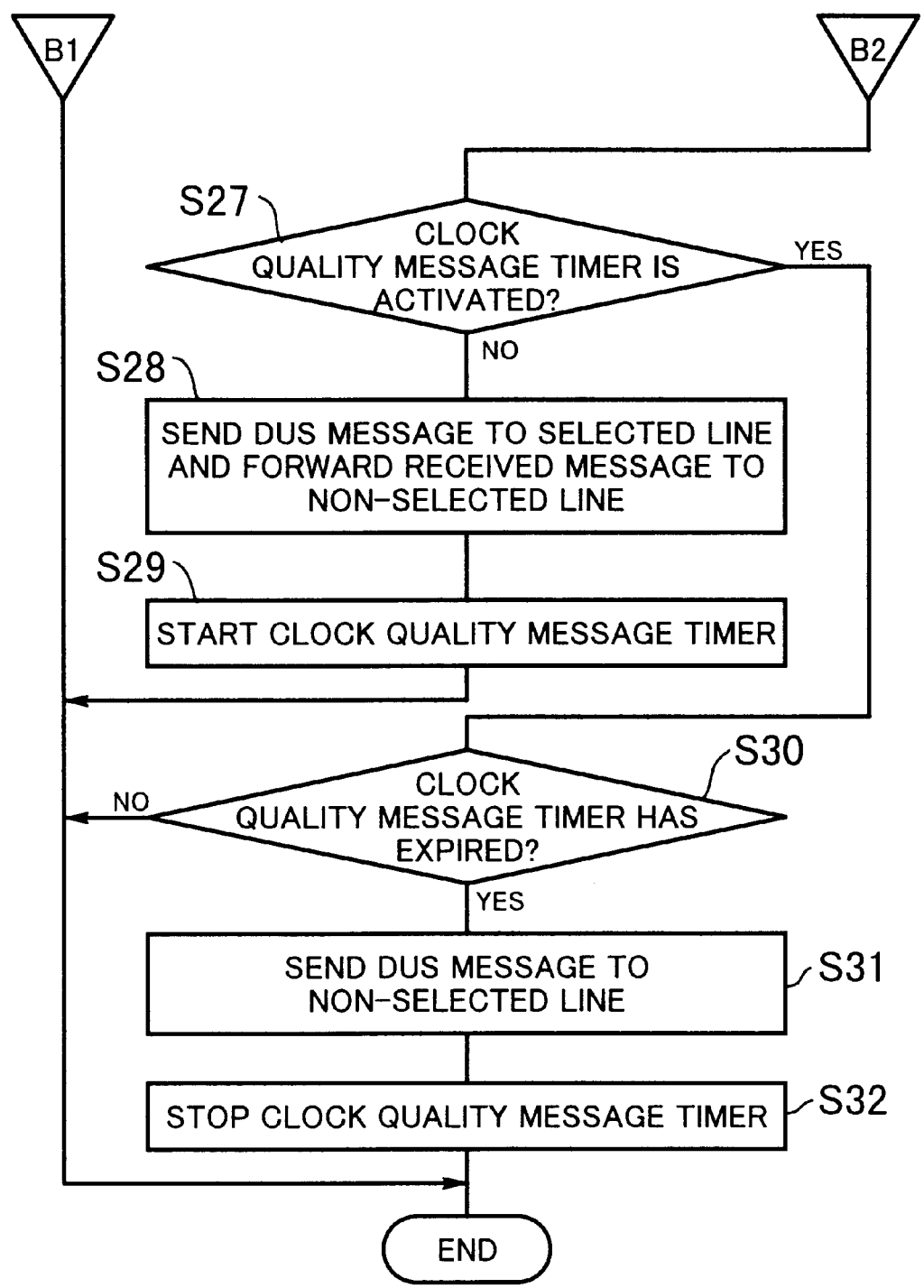

FIGS. 6 and 7 are the first and second halves of a flowchart showing how the clock selection controller in each slave transmission unit transmits clock quality messages to its neighboring transmission units. Note here that this message transmission process is executed repetitively at predetermined intervals, in conjunction with the clock selection process described above. The following explanation will follow the order of step numbers (S21 to S32) shown in FIGS. 6 and 7.

(S21) Based on a clock quality message received from the line being selected, the clock selection controller judges the validity of the present reference clock source. If the present source is found invalid, the process skips to step S23. Otherwise, it proceeds to the step S22.

(S22) The clock selection controller receives clock quality messages from both lines, GP1 and GP2, and it judges whether the both messages indicate DUS condition. If the both lines are found to be in DUS condition, the process advances to step S23. If either GP1 or GP2 line is valid, the process branches to step S24.

(S23) The clock selection controller 29 sends a DUS message to both the GP1 and GP2 lines.

(S24) Based on the clock quality messages received from the GP1 and GP2 lines, the clock selection controller judges whether the clock quality levels of the two lines agree with each other. If they are identical, the process branches to step S27. If they are not identical, the process advances to step S25.

(S25) The clock selection controller transmits a DUS message to the line being selected as the reference clock source for synchronization. To the non-selected line, it forwards the clock quality message received from the selected line.

(S26) The clock selection controller stops the operation of a "clock quality message timer." The clock selection controller has a clock quality message timer to measure the duration of a specific condition where both GP1 and GP2 lines maintain equal clock qualities. More specifically, the timer has a certain preset value, and the expiration of the timer indicates that the equal-quality condition lasted for the predetermined period. As will be described later, the timer is started in step S29 and stopped in steps S26 and S29.

(S27) The clock selection controller checks whether the clock quality message timer is activated or not. If the timer is activated, the process branches to step S30. If not, the process advances to step S28.

(S28) The clock selection controller transmits a DUS message to the line that has been selected as the reference clock source for synchronization, while forwarding to the non-selected line the clock quality message received from the selected line.

(S29) The clock selection controller triggers the clock quality message timer to start a new cycle of time measurement operation.

(S30) The clock selection controller checks whether the clock quality message timer has expired. If it has expired, the process advances to step S31. If not, the process is terminated.

(S31) The clock selection controller transmits a DUS message to the line that has not been selected as the reference clock source.

(S32) The clock selection controller stops the operation of the clock quality message timer, and it terminates the process.

Figure 8:
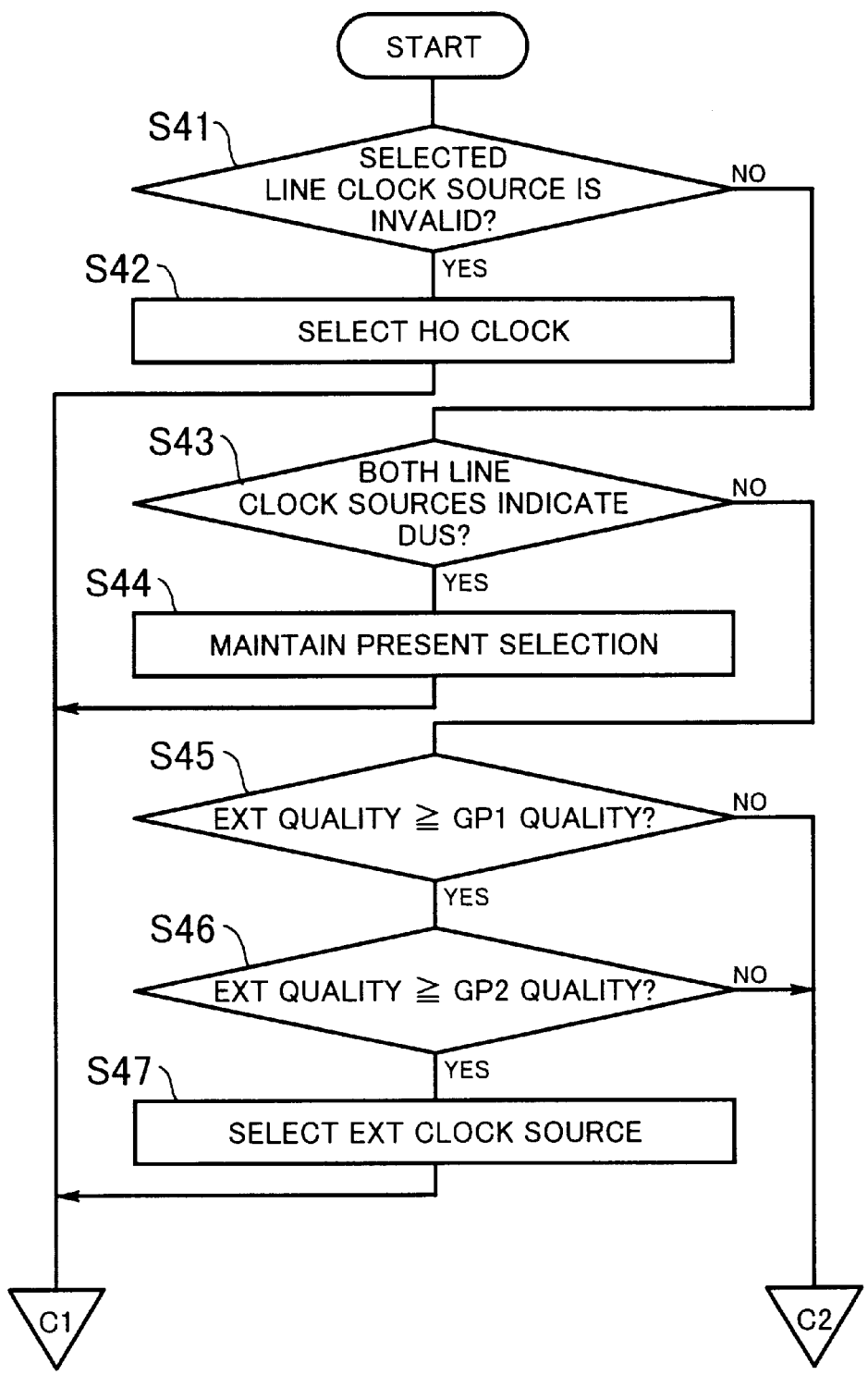
FIGS. 8 and 9 are the first and second halves of a flowchart which shows how the clock selection controller in the master transmission unit selects a reference clock source.
Figure 9:
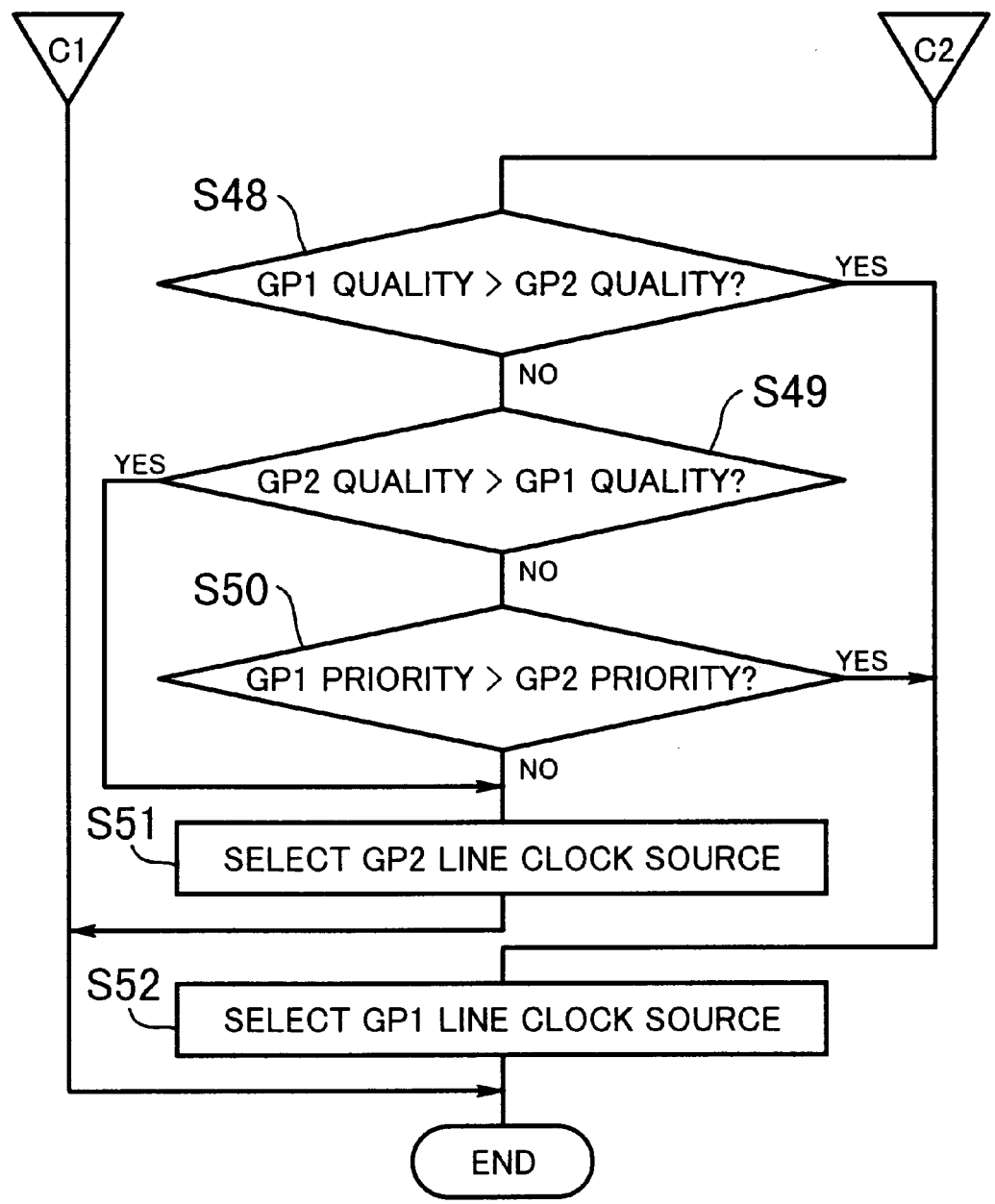

FIGS. 8 and 9 are the first and second halves of a flowchart showing how the clock selection controller in the master transmission unit selects an appropriate reference clock source. Note here that this process is executed repetitively at predetermined intervals. The following explanation will follow the order of step numbers (S41 to S52) shown in FIGS. 8 and 9.

(S41) Based on a clock quality message received from the external clock source being selected, the clock selection controller judges the validity of the present source. If the present source is found invalid, the process skips to step S42. Otherwise, it proceeds to the step S43.

(S42) The clock selection controller selects the HO clock as the master clock.

(S43) The clock selection controller receives clock quality messages from both GP1 and GP2 lines, and it judges whether the both messages indicate DUS condition. If the both lines are in DUS condition, the process advances to step S44. If either GP1 or GP2 line is valid, the process branches to step S45.

(S44) The present choice of the reference clock source is maintained.

(S45) The clock selection controller compares the quality of the external clock source with the quality indicated by the clock quality message received from the GP1 line. If the former is equal to or higher than the latter, the process advances to step S46. Otherwise, the process branches to step S48.

(S46) The clock selection controller compares the quality of the external clock source with the quality indicated by the clock quality message received from the GP2 line. If the former is equal to or higher than the latter, the process advances to step S47. Otherwise, the process branches to step S48.

(S47) The clock selection controller chooses the present external clock source as the reference clock source.

(S48) Based on the clock quality messages received from the GP1 and GP2 lines, the clock selection controller judges whether the clock quality level of the GP1 line is higher than that of the GP2 line. If the GP1's priority level is higher than the GP2's, the process proceeds to step S52. Otherwise, the process advances to step S49.

(S49) Based on the clock quality messages received from the GP1 and GP2 lines, the clock selection controller judges whether the clock quality level of the GP2 line is higher than that of the GP1 line. If the GP2's priority level is higher than the GP1's, the process proceeds to step S51. Otherwise, it advances to step S50.

(S50) The clock selection controller examines the clock source list to determine whether the GP1 line has a higher priority level than the GP2 line. If the GP1s priority level is higher than the GP2's, the process proceeds to step S52. Otherwise, it advances to step S51.

(S51) The clock selection controller chooses the GP2 line clock source as the master clock for synchronization.

(S52) The clock selection controller chooses the GP1 line clock source as the master clock for synchronization.

Figure 10:
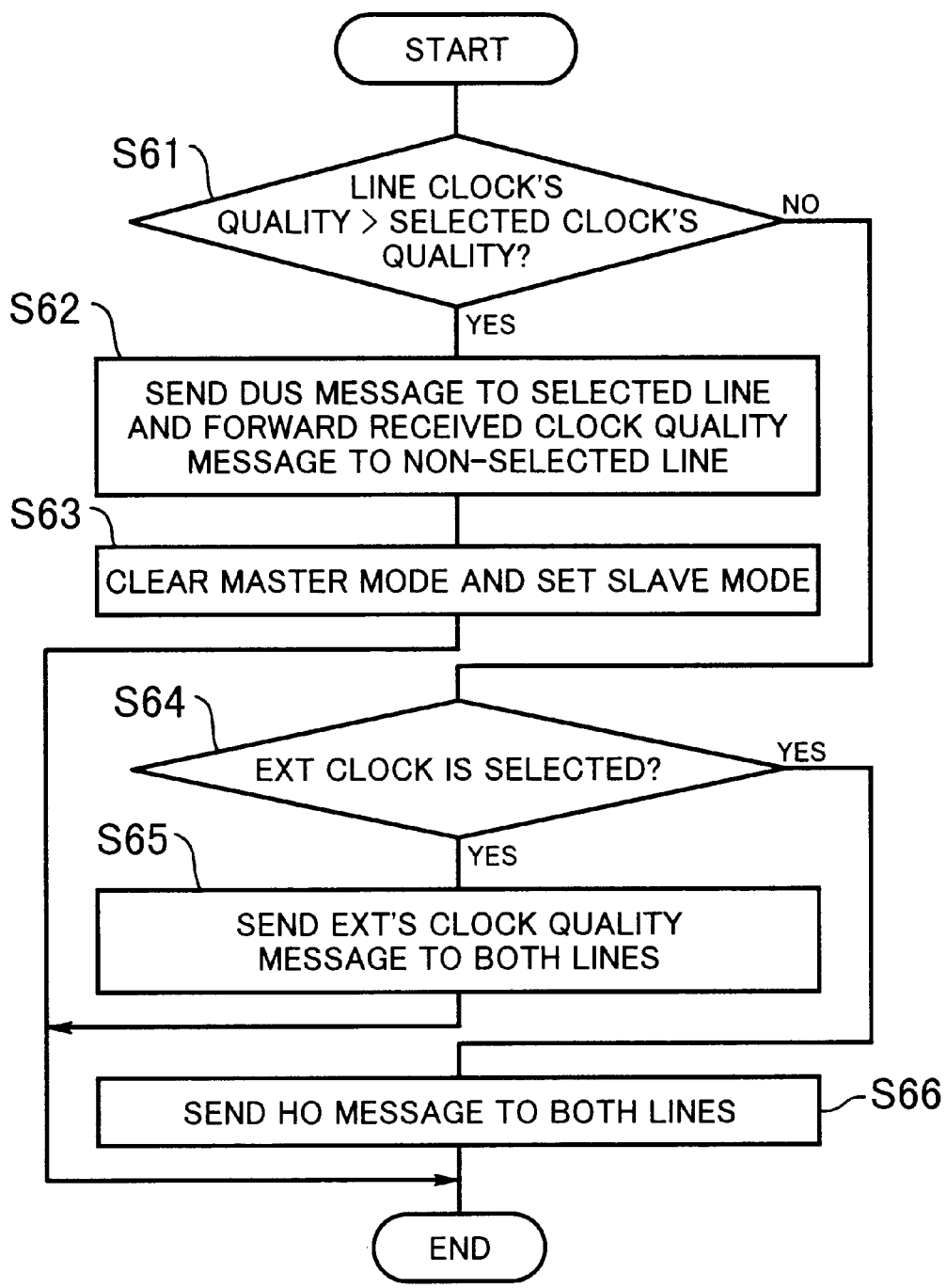
FIG. 10 is a flowchart which shows how the clock selection controller in the master transmission unit transmits clock quality messages.

FIG. 10 is a flowchart which shows how the clock selection controller in the master transmission unit transmits clock quality messages to slave units. Note that this message transmission process is executed repetitively at predetermined intervals, in conjunction with the clock selection process described above. The following explanation will follow the order of step numbers (S61 to S66) shown in FIG. 10.

(S61) Examining clock quality messages received from the lines, the clock selection controller judges whether the line clock sources is higher than the quality of the present master clock source. If the line clock source has a higher quality, the process advances to step S62. Otherwise, it proceeds to step S64.

(S62) The clock selection controller transmits a DUS message to the line that has been selected as the reference clock source for synchronization. To the non-selected line, the clock selection controller forwards the clock quality message received from the selected line.

(S63) The clock selection controller changes the master/slave mode flag from master to slave, thus allowing the transmission unit to turn itself into a slave transmission unit.

(S64) The clock selection controller checks whether the external clock source is selected as the reference clock source for synchronization (master clock). If it is selected, the process advances to step S65. If not, the process proceeds to step S66.

(S65) The clock selection controller transmits clock quality messages to both lines to indicate the quality level of the external clock source being selected.

(S66) The clock selection controller transmits clock quality messages to the both lines to notify the neighboring transmission units that it is now in holdover (HO) mode.

Referring now to FIGS. 11(A) to 15(B), the next section will explain how the above-described transmission units will synchronize themselves with a single reference clock source. Based on the network of FIG. 2, FIGS. 11(A) to 15(B) illustrate the behavior of the transmission units. Note here that the transmission units 20, 40, 50, and 60 in FIG. 2 are named "node A," "node B," "node C," and "node D," and the external clock sources 20a and 50a are called "EC1" and "EC2," respectively. Further, each box representing the nodes A to D contains text strings that show the reference clock source being selected for synchronization, as well as the clock source list being used for clock source selection. The selected source is enclosed in angle brackets (e.g., <EXT>), while the clock source list presents three entries of potential clock sources. Concerning the naming convention used in clock source lists, priority symbols "PRI1," "PRI2," and "PRI3" indicate the highest, the second, and the lowest priority levels, respectively. Symbols representing clock sources include: "EXT" for an external clock source local to the transmission unit, "GP1" for one of the two optical cables extending to the neighboring transmission units, and "GP2" for the other one, as mentioned in an earlier section. These symbols "GP1" and "GP2" can also be interpreted as two interface units that each transmission unit uses to communicate with its neighboring transmission units.

The blocks "EC1" and "EC2," which represent external clock sources, enclose clock quality symbols "G812" and "G811." These symbols "G812" and "G811," together with other symbols "HO" and "DUS," indicate the quality levels of reference clock signals that are carried over the optical link cables from one node to another. The symbol "HO" denotes that the present state of the reference clock signal is kept intact, since the node no longer has usable external and line clock sources for synchronization. The order of the clock quality levels is defined as follows.

$$G812 > G811 > HO > DUS$$

Further, in FIGS. 11(A) to 15(B), a bold box represents a special node that is configured as a master transmission unit. Actually, only node A or node C can serve as the master transmission unit.

When a problem occurs in one external clock source, all transmission units reconfigure the network's synchronization distribution scheme to use the other external clock source as a new reference signal. Being arranged in chronological order, FIGS. 11(A) to 14(B) specifically show this reconfiguration process executed in a short transient period. With reference to these figures, the following section will clarify that the present invention avoids the formation of a closed timing loop, while allowing all the transmission units to include both GP1 and GP2 lines in their respective clock source lists.

First, FIG. 11(A) shows a normal situation, where the network has no problems and all transmission units are synchronized with the external clock source EC1 that is local to the node A. Serving as the master transmission unit, the node A executes the clock selection process of FIG. 8. In the very first cycle of this process, it takes a path of "NO" in step S41, "NO" in step S43, "YES" in step S45, and "YES" in step S46, thus setting up the external clock source EC1 as the master clock source in step S47. In the next and later execution cycles, it will take the same path of "NO" in step S41, but "YES" in step S43, thus reaching step S44. Here, the node A falls into a normal mode to maintain the status quo.

In the message transmission process of FIG. 10, the node A takes a path of "NO" in step S61 and "YES" in step S64. This results in the execution of step S65, whereby the node A outputs G812 clock quality messages to both GP1 and GP2 lines to indicate the EC1's quality level.

The node D, a slave transmission unit next to the node A, then starts the process of FIG. 4, taking a path of "NO" in step S1, "NO" in step S2, "NO" in step S4, and "YES" in step S9. Therefore, the node D chooses its GP1 line clock source in step S13 of FIG. 5.

In the subsequent clock quality message transmission process of FIG. 6, the node D takes a path of "NO" in step S21, "NO" in step S22, and "NO" in step S24. This results in the execution of step S25, whereby the node D sends a DUS message to the selected GP1 line and a G812 message to the non-selected GP2 line. The node D simply skips step S26, because the clock quality message timer has not been activated.

The node B, another slave transmission unit, executes the clock selection process of FIGS. 4 and 5, taking a path of "NO" in step S1, "NO" in step S2, "NO" in step S4, "NO" in step S9, "NO" in step S10, and "YES" in step S11. Accordingly, the node B chooses its GP1 line clock source in step S13 of FIG. 5.

In the very first cycle of the message transmission process of FIGS. 6 and 7, the node B takes a path of "NO" in step S21, "NO" in step S22, "YES" in step S24, and "NO" in step S27, thus executing step S28. Therefore, the node B sends a DUS message to the selected GP1 line and a G812 message to the non-selected GP2 line. It also activates its own clock quality message timer in step S29, thereby starting time measurement.

In the next cycle of the same process of FIGS. 6 and 7, the node B takes a path of "NO" in step S21, "NO" in step S22, "YES" in step S24, "YES" in step S27, and "NO" in step S30. This execution path is traced also in later cycles, until the clock quality message timer expires and the decision in step S30 results in "YES." This expiration of the timer causes the node B to send a DUS message to the non-selected GP2 line in step S31, as well as terminating the timer operation in step S32.

In this way, the slave transmission units are designed to send a DUS message to the non-selected GP2 line not immediately, but after a predetermined idle time has passed. This feature prevents the slave transmission units from sending a DUS message to the non-selected GP2 line when both GP1 and GP2 lines exhibit the same clock quality levels just temporarily.

Suppose here that an error has occurred in the external clock source EC1, for instance. FIG. 11(B) explains how the node A will operate in such a fault situation.

Serving as the master transmission unit, the node A executes the clock selection process of FIG. 8, and it takes a path of "YES" in step S41, thus switching the master clock from the external clock source EC1 to its local HO clock (i.e., the output of the holdover unit 32 shown in FIG. 3) in the subsequent step S42. Accordingly, the node A executes the message transmission process of FIG. 10 by taking "NO" in steps S61 and S64, and thus it finally delivers an HO clock quality message to both the GP1 and GP2 lines.

Figure 12B:
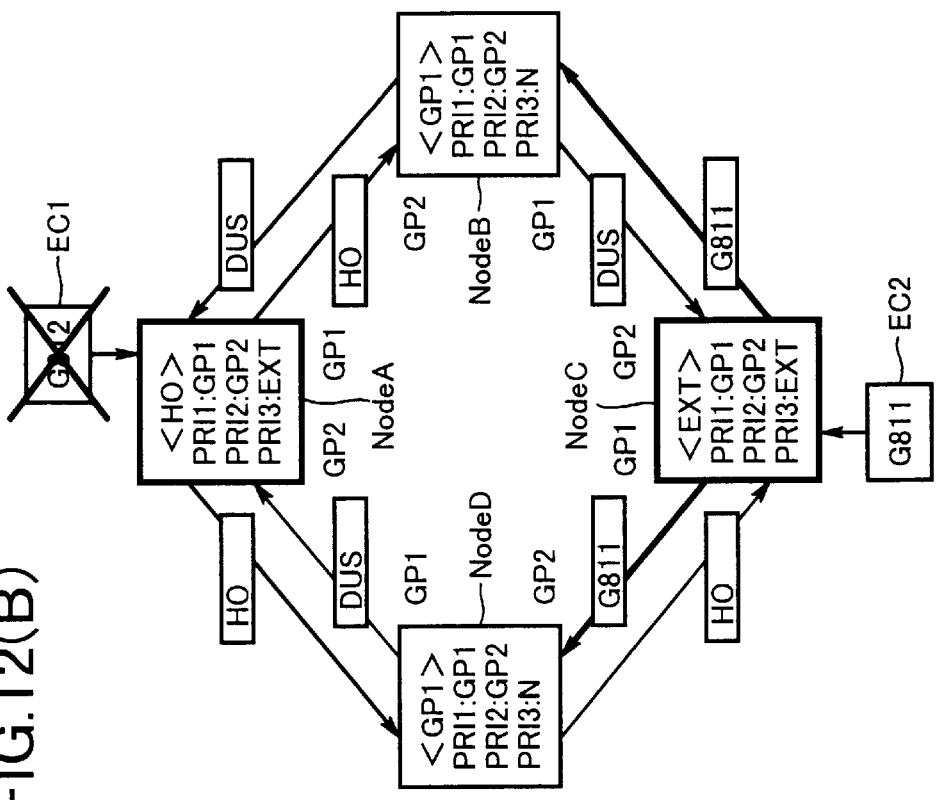
FIG. 12(B) is a diagram showing how the node C will behave after the node D has worked as shown in FIG. 12(A)
Figure 12A:
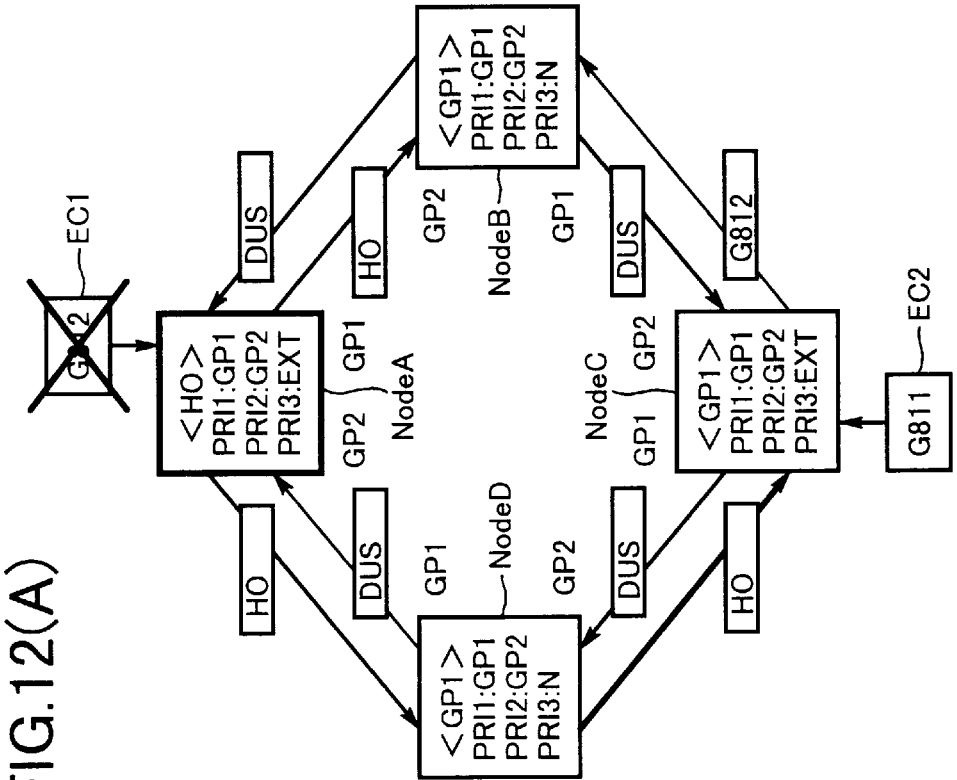
FIG. 12(A) is a diagram showing how the node D will behave after the node A has worked as shown in FIG. 11(B).

FIG. 12(A) shows the behavior of the node D just after the node A has selected its HO clock as described in FIG. 11(B). The node D, a slave transmission unit, executes the process of FIGS. 4 and 5, taking a path of "NO" in step S1, "NO" in step S2, "NO" in step S4, and "YES" in step S9. Therefore, the node D still chooses its GP1 line clock source in step S13 of FIG. 5.

Now, in the process of FIG. 6, the node D takes a path of "NO" in step S21, "NO" in step S22, and "NO" in step S24. Thus it executes step S25, thereby sending a DUS message to the selected GP1 line and an HO message to the non-selected GP2 line. The node D skips step S26, because the clock quality message timer has not been activated.

FIG. 12(B) shows how the node C will work after the node D's operation in FIG. 12(A). Serving as a slave transmission unit, the node C executes the process of FIG. 4. In this process, the node C takes a path of "NO" in step S1, "NO" in step S2, "YES" in step S4, "YES" in step S5, and "YES" in step S6, thus selecting in step S7 the external clock source EC2 as the reference clock source for synchronization. Subsequently, in step S8, the node C configures itself as a master transmission unit. When the node C executes the message transmission process of FIG. 10, it takes a path of "NO" in step S61 and "YES" in step S64. The node C then executes step S65, thereby outputting a G811 clock quality message to both GP1 and GP2 lines to indicate the EC2's quality level.

FIG. 13(A) shows how the nodes B and D will work after the node C's operation in FIG. 12(B). The node B, a slave transmission unit, executes the process of FIGS. 4 and 5, taking a path of "NO" in step S1, "NO" in step S2, "NO" in step S4, and "YES" in step S9. Therefore, the node B chooses its GP1 line clock source in step S13.

In the subsequent process of FIG. 6, the node B takes a path of "NO" in step S21, "NO" in step S22, and "NO" in step S24, thus executing step S25. Thus, the node B sends a DUS message to the selected GP1 line, while delivering a G811 message to the non-selected GP2 line. The node B skips step S26, because the clock quality message timer has not been activated.

The node D executes the process of FIGS. 4 and 5, taking a path of "NO" in step S1, "NO" in step S2, "NO" in step S4, "NO" in step S9, and "YES" in step S10. The node D now chooses its GP2 line clock source in step S12.

In the process of FIG. 6, the node D takes a path of "NO" in step S21, "NO" in step S22, and "NO" in step S24. This makes the node D execute step S25, thereby transmitting a DUS message to the selected GP2 line and a G811 clock quality message to the non-selected GP1 line. The node D skips step S26, because the clock quality message timer has not been activated.

FIG. 13(B) shows how the node A will behave after the operation of the nodes B and D in FIG. 13(A). Still working as the master transmission unit, the node A executes a process of FIGS. 8 and 9. It takes a path of "NO" in step S41, "NO" in step S43, "NO" in step S45, "NO" in step S48, "NO" in step S49, and "YES" in step S50, thus selecting its GP1 line in step S52.

In the subsequent process of FIG. 10, the node A executes step S62 after answering "YES" in step S61. Here, it transmits a DUS message to the selected GP1 line and a G811 clock quality message to the non-selected GP2 line. Subsequently, in step S63, the node A reconfigures itself as a slave transmission unit.

Figure 14A:
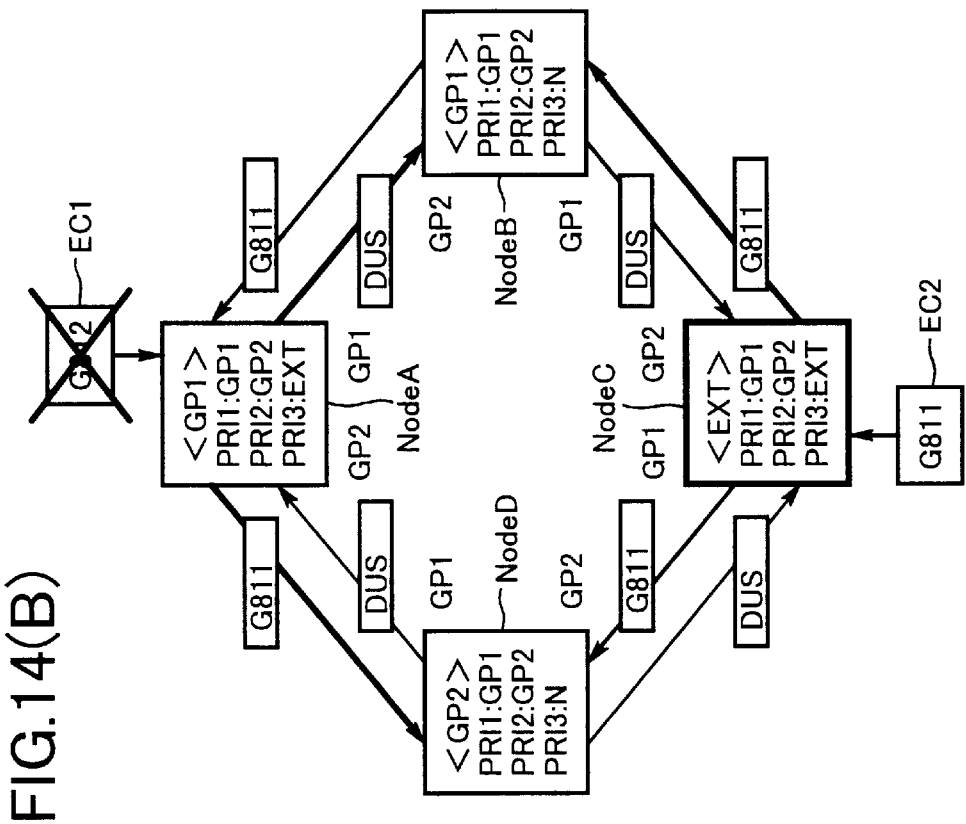
FIG. 14(A) is a diagram showing how the node D will behave after the node A has worked as shown in FIG. 13(B)

FIG. 14(A) shows how the node D will behave after the node A has completed its operation in FIG. 13(B). As a slave unit, the node D executes the process of FIGS. 4 and 5, taking a path of "NO" in step S1, "NO" in step S2, "NO" in step S4, "NO" in step S9, "NO" in step S10, and "YES" in step S11. The node D thus chooses its GP1 line clock source in step S13.

In the process of FIGS. 6 and 7, the node D traces a path of "NO" in step S21, "NO" in step S22, "YES" in step S24, and "NO" in step S27. The node D then executes step S28, thereby transmitting a DUS message to the selected GP1 line and a G811 message to the non-selected GP2 line. The node D further activates its clock quality message timer in step S29 to start time measurement.

Figure 14B:
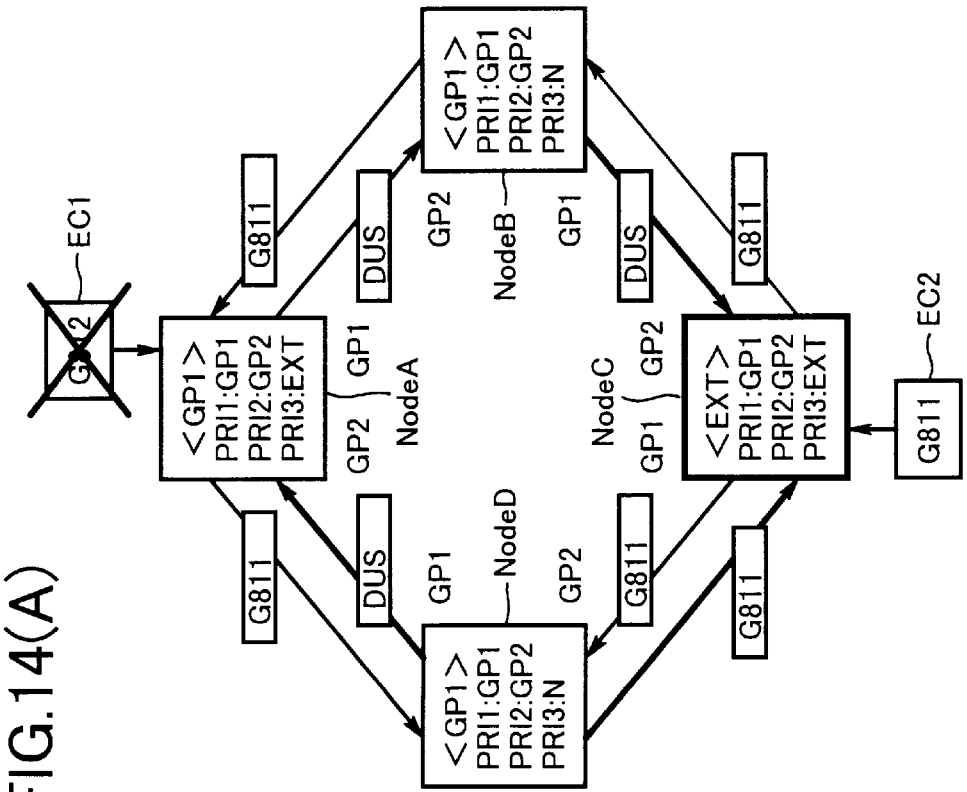
FIG. 14(B) is a diagram showing how the node D will behave after it has worked as shown in FIG. 14(A)

FIG. 14(B) shows how the node D will behave after it operated as shown in FIG. 14(A). In the next execution cycle of the clock selection process of FIGS. 6 and 7, the node D takes a path of "NO" in step S21, "NO" in step S22, "YES" in step S24, "YES" in step S27, and "NO" in step S30. This execution path is traced again in later cycles, until the clock quality message timer expires and the decision in step S30 results in "YES." Finally, the node B sends a DUS message to the non-selected GP2 line in step S31 and terminates the timer operation in step S32.

In the way described above, the reference clock source of the network is successfully switched from EC1 to EC2. As FIG. 14(A) shows, G811 clock quality messages are supplied from the node D to the node C at first. These messages, however, will change to DUS messages upon expiration of a predetermined time period, as illustrated in FIG. 14(B). This feature prevents the node C from selecting its GP1 line clock source for synchronization, thus avoiding the occurrence of a closed timing loop.

Now, the next section will demonstrate that all the transmission units in the network of FIG. 2 can reliably synchronize themselves with a single external clock source, even when a problem has happened to a link between transmission units.

Figure 15A:
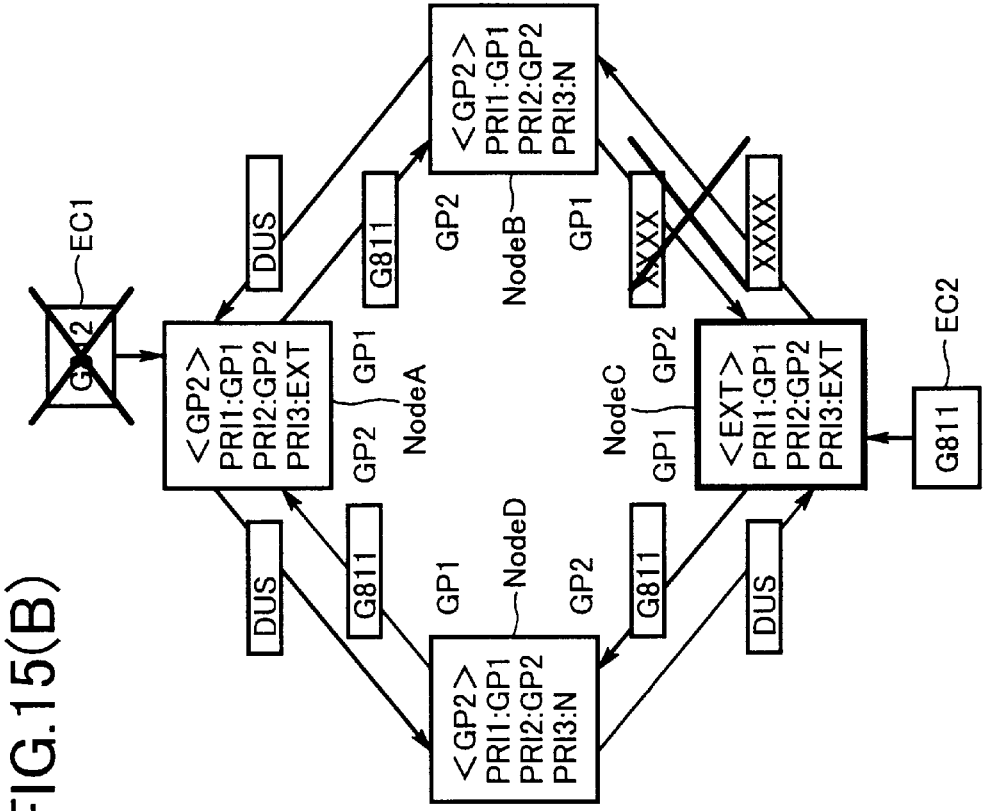
FIG. 15(A) is a diagram showing how the node A and node B will behave when a link problem between the node B and node C is encountered after the node D has worked as shown in FIG. 14(B)

FIG. 15(A) shows how the nodes A and B will behave when a link problem between the nodes B and C is encountered subsequently to the node D's operation in FIG. 14(B). Serving as a slave transmission unit, the node B starts the clock selection process of FIG. 4. Since step S1 results in "YES," the node B chooses its own HO clock as the master clock source in step S3. Accordingly, in the subsequent message transmission process of FIG. 6, the node B answers "YES" in step S21 and reaches step S23, where it transmits a DUS message to both GP1 and GP2 lines.

Another slave transmission unit, node A, takes a path of "NO" in step S1, and "YES" in step S2 in the process of FIG. 4. Therefore, the node A also selects its local HO clock as the master clock. In the subsequent process of FIG. 6, the node A reaches step S23 through a path of "NO" in step S21 and "YES" in step S22, thus transmitting a DUS message to its GP1 and GP2 lines.

Figure 15B:
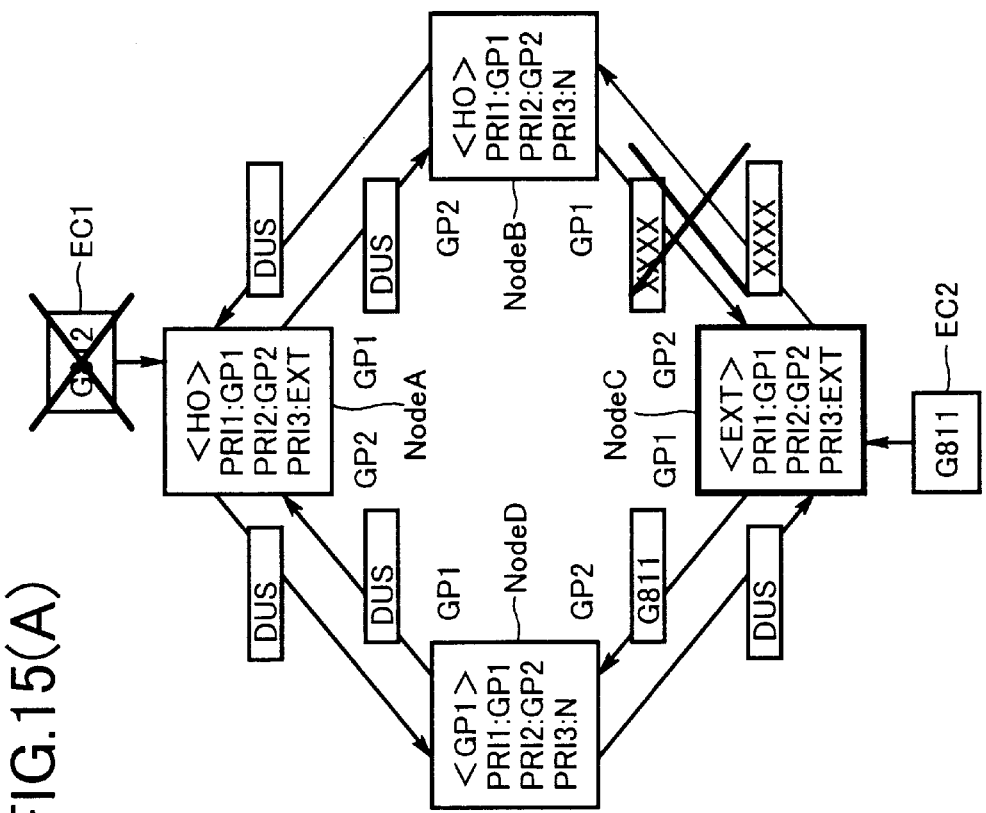
FIG. 15(B) is a diagram which shows how the node D, node A, and node B will behave after the node A and node B have worked as shown in FIG. 15(A)

FIG. 15(B) shows how the nodes D, A, and B will behave after the operation of the nodes B and A in FIG. 15(A). As a slave transmission unit, the node D executes the process of FIGS. 4 and 5, taking a path of "NO" in step S1, "NO" in step S2, "NO" in step S4, "NO" in step S9, and "YES" in step S10. The node D now chooses its GP2 line clock source in step S12. Consequently, in the process of FIG. 6, the node D traces a path of "NO" in step S21, "NO" in step S22, and "NO" in step S24. This makes the node D execute step S25, thereby transmitting a DUS message to the selected GP2 line and a G811 clock quality message to the non-selected GP1 line. The node D skips step S26, because the clock quality message timer has not been activated.

The node A, serving as a slave transmission unit, executes the process of FIGS. 4 and 5. It now follows a path of "NO" in step S1, "NO" in step S2, "NO" in step S4, "NO" in step S9, and "YES" in step S10, and chooses its GP2 line clock source in step S12. Accordingly, in the subsequent process of FIG. 6, the node A takes a path of "NO" in step S21, "NO" in step S22, and "NO" in step S24. This makes the node A execute step S25 to transmit a DUS message to the selected GP2 line, as well as sending a G811 message to the non-selected GP1 line. The node A skips step S26, because the clock quality message timer has not been activated.

The next slave transmission unit, node B, executes the process of FIGS. 4 and 5, tracing a path of "NO" in step S1, "NO" in step S2, "NO" in step S4, "NO" in step S9, and "YES" in step S10. Therefore, the node B now chooses its GP2 line clock source in step S12. When executing the process of FIG. 6, the node B takes a path of "NO" in step S21, "NO" in step S22, and "NO" in step S24, thus reaching step S25. The node B sends a DUS message to the selected GP2 line, while attempting to transmit a G811 message to the non-selected GP1 line. The node B skips step S26, because the clock quality message timer has not been activated.

As clarified above, the nodes D, A, and B synchronize themselves with the EC2 clock source in this sequence, even if the link between the nodes B and C has failed. As a result, all the transmission units in the network can keep the synchronization with a single external clock source.

The next section will describe a second embodiment of the present invention. Because the second embodiment has basically the same structure as the first embodiment, the following explanation uses the same assumption as that in the first embodiment. However, the second embodiment differs from the first embodiment in that the clock quality of the external clock source 20a is graded G811. This means that the two external clock sources 20a and 50a have the same quality levels.

Figure 16A:
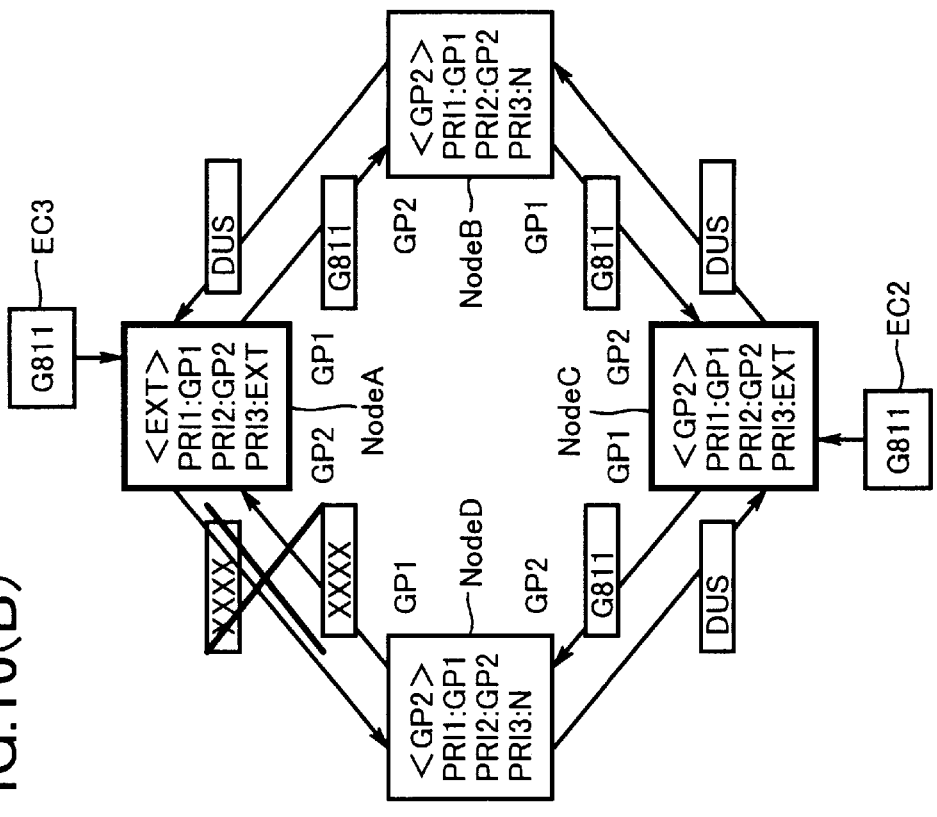
FIG. 16(A) is a diagram showing how the node D and node C will behave when a link problem between the node A and node D is encountered.
Figure 16B:
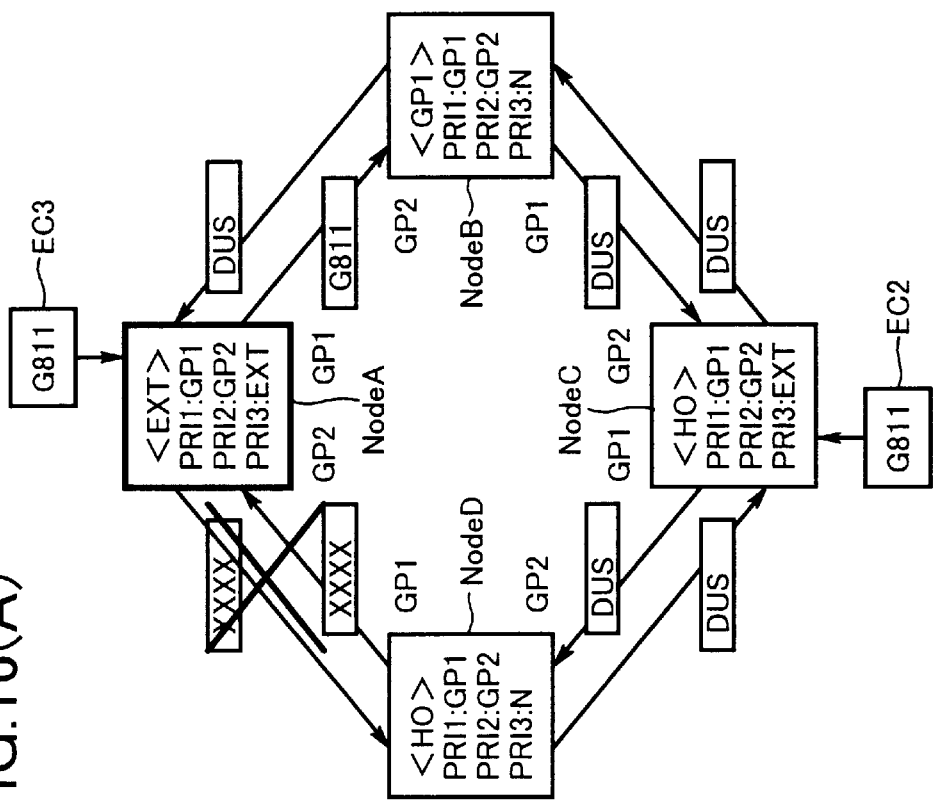
FIG. 16(B) is a diagram which shows how the node B, node C, and node D will behave after the node D and node C have worked as shown in FIG. 16(A)
Figure 17:
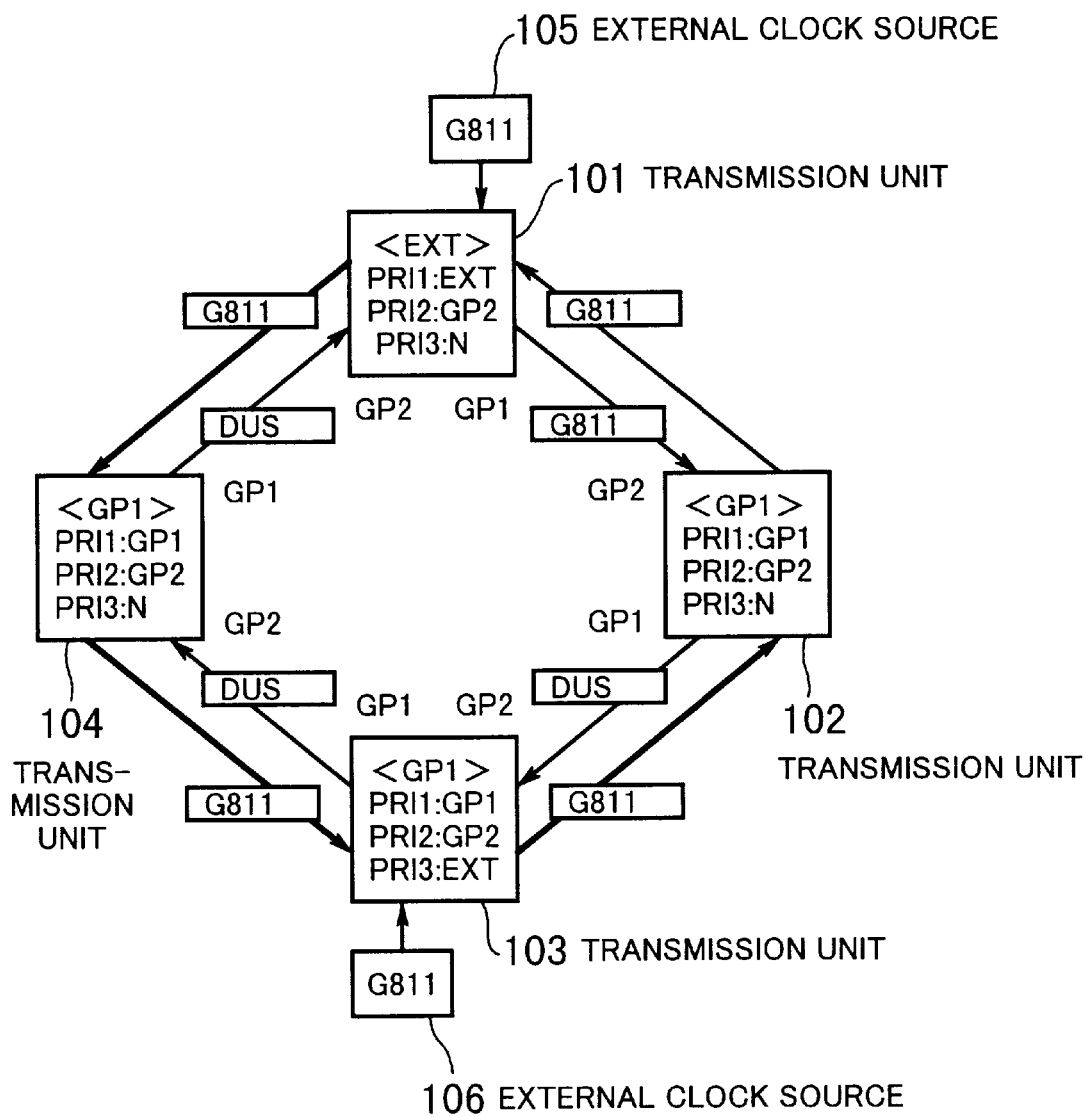
FIG. 17 is a diagram which shows an example of a conventional ring network.
Figure 18:
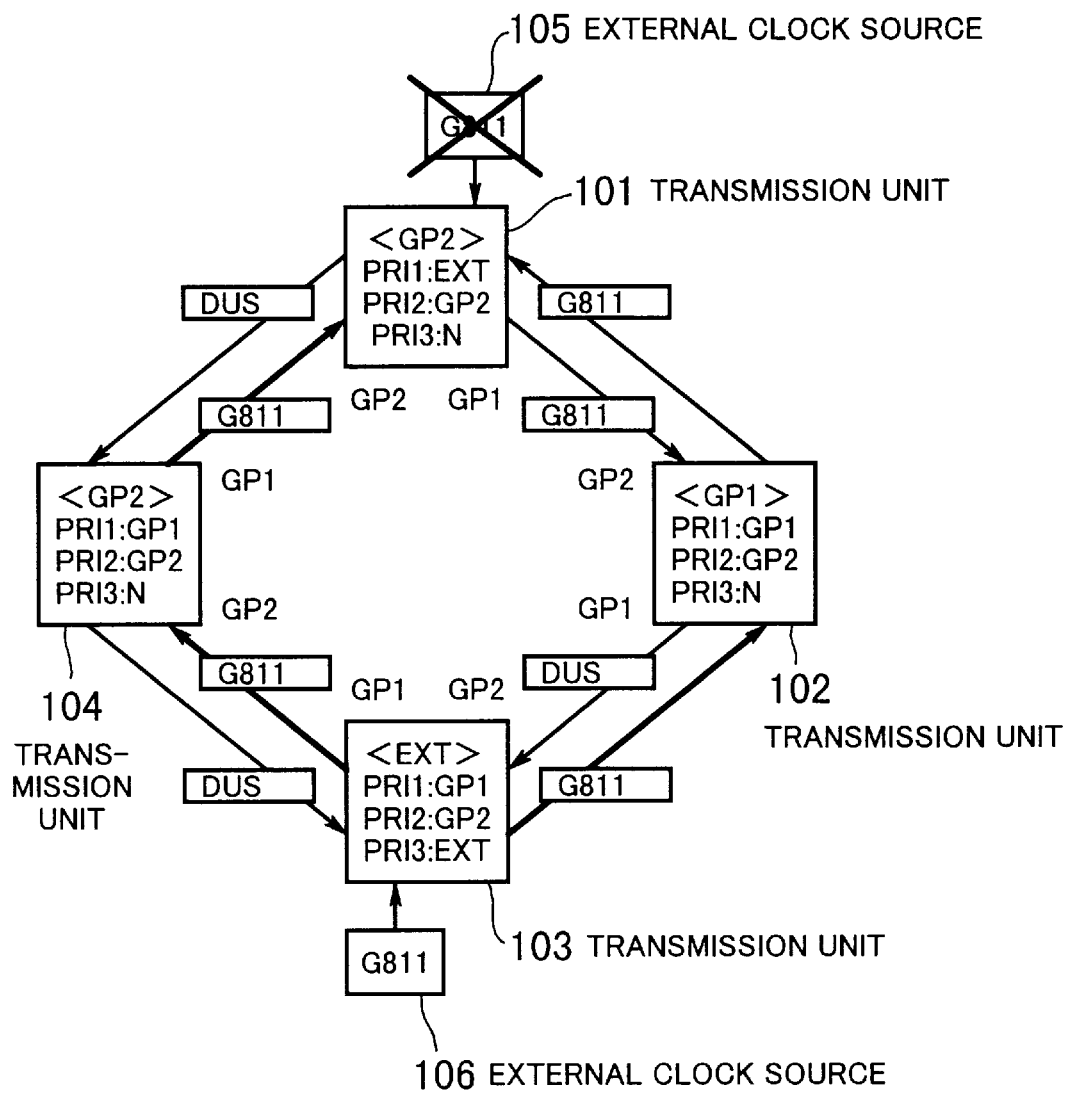
FIG. 18 is a diagram showing a synchronization distribution path over which the clock signals propagate, when a problem has occurred in the external clock source that has been used in the network of FIG. 17.
Figure 19:
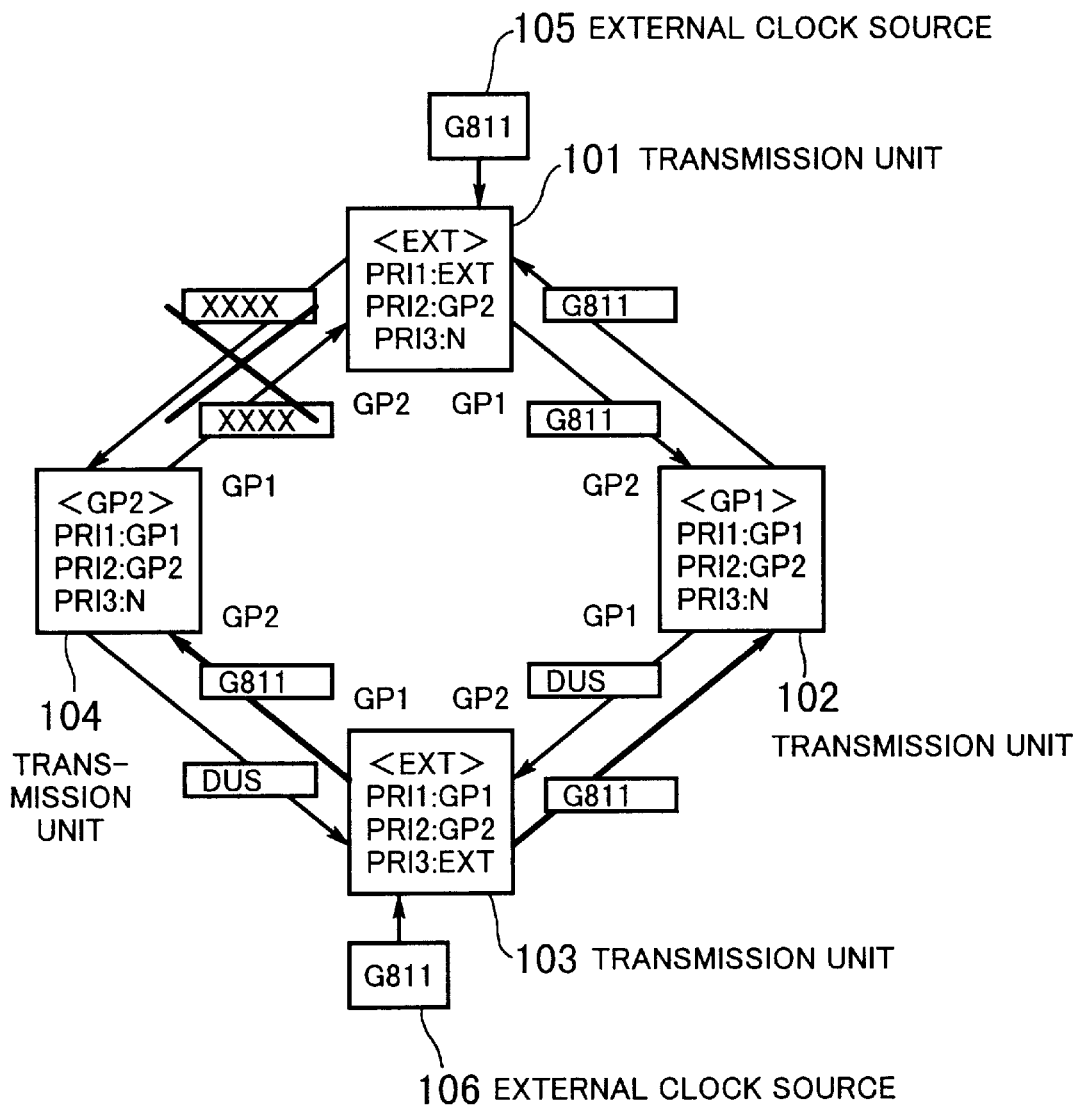
FIG. 19 is a diagram which shows a network in another fault situation where a problem has happened to a link between two transmission units, while external clock sources have no problems.
Figure 20:
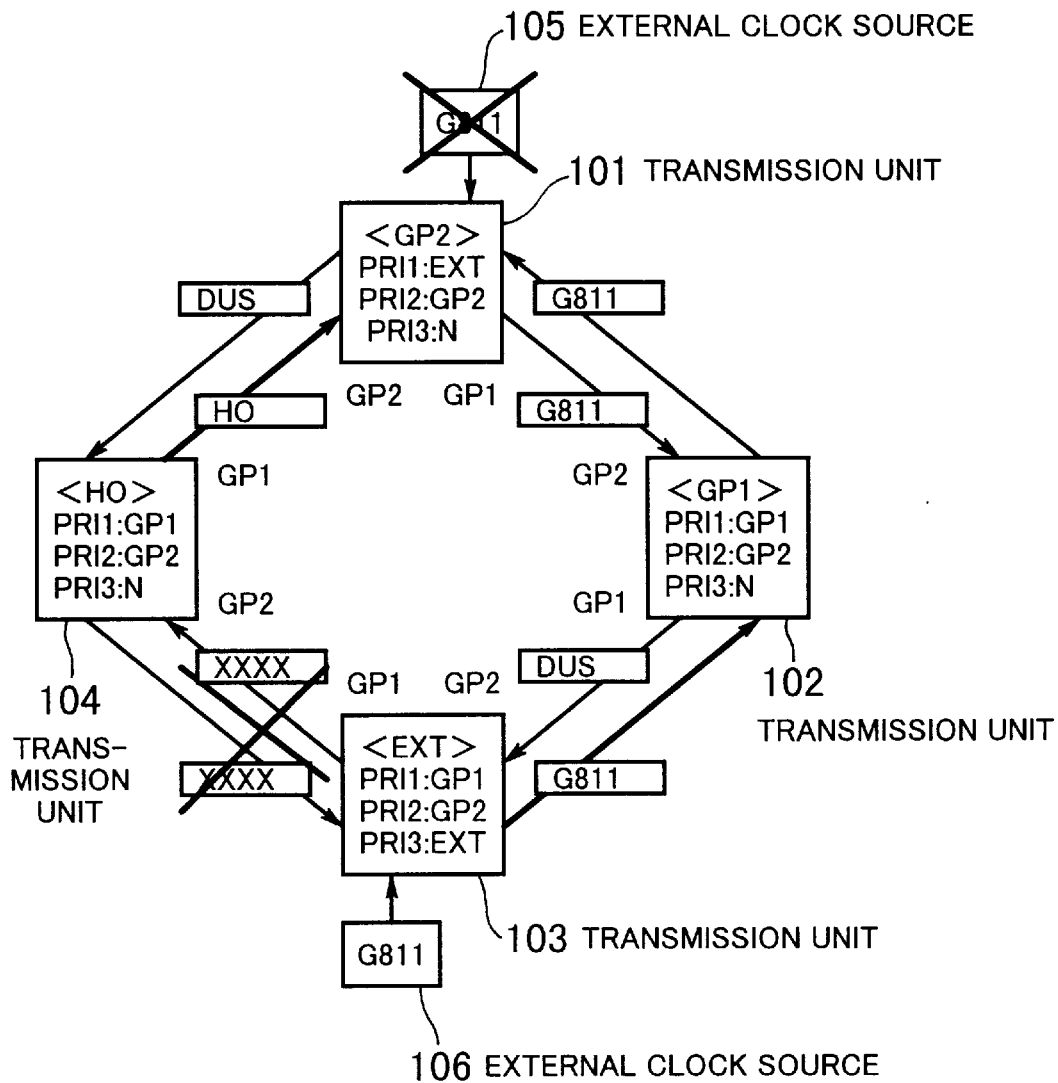
FIG. 20 is a diagram which shows a network in still another fault situation where the external clock source is inoperative, and a link between two transmission units has encountered a problem.
Figure 21:
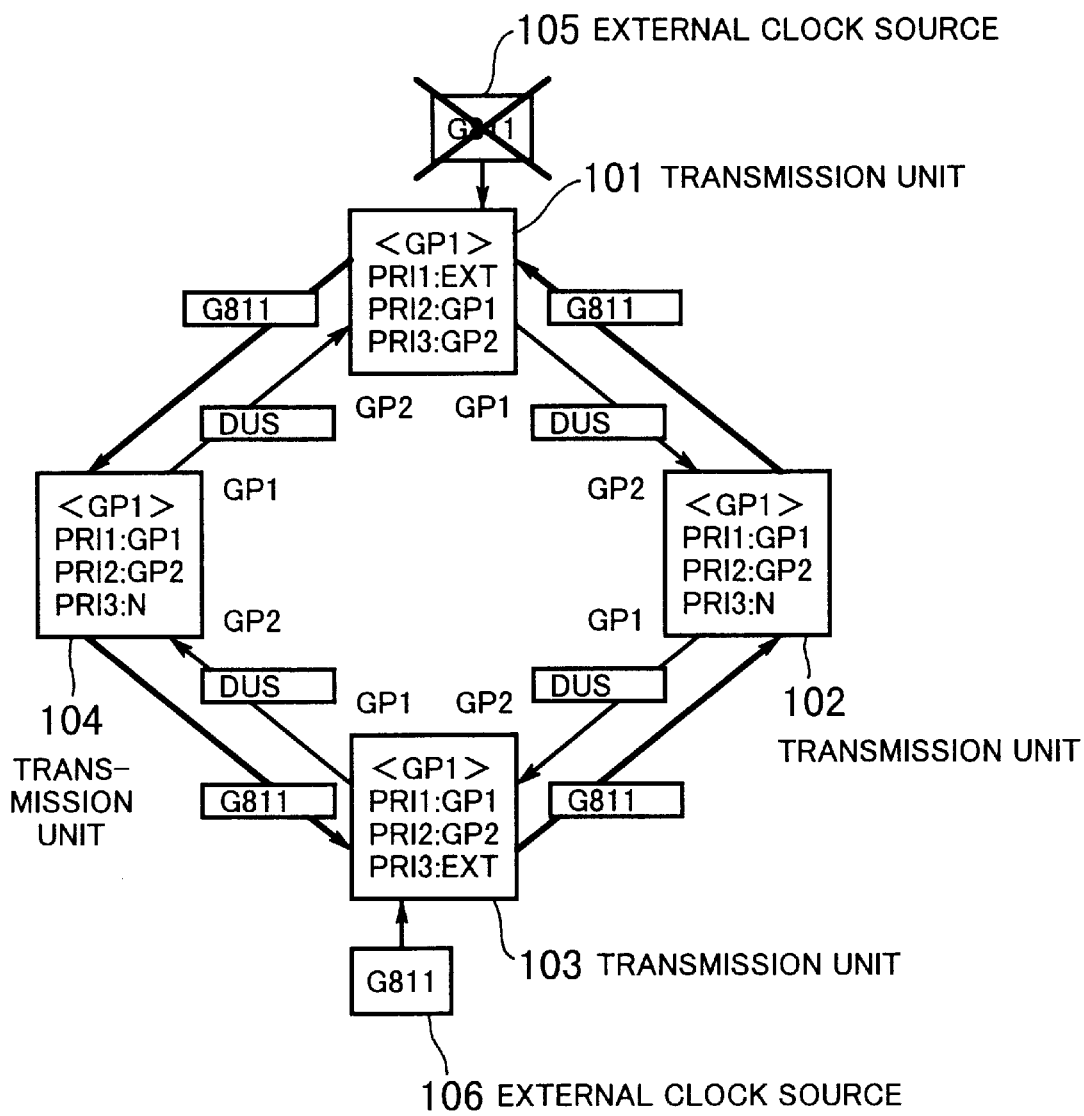
FIG. 21 is a diagram which shows how the network will behave, when both "GP1" and "GP2" lines are registered in the clock source list of a transmission unit 101.

FIGS. 16(A) and 16(B) illustrate how the transmission units achieve clock synchronization in a transmission network of the second embodiment. In this illustrated network system, the nodes and clock sources are referred to by the same symbols "node A," "node B," "node C," "node D," and "EC2," except for the external source 20a, which is renamed from "EC1" to "EC3." The notation for the selected reference clock sources and clock source lists is the same as that in the first embodiment.

FIG. 16(A) shows how the nodes D and C will work when a link problem between the nodes A and D has occurred. Refer to FIG. 11(A) for the initial synchronization setup of this network.

When the link problem happens, the node D takes a path of "YES" in step S1 in the process of FIG. 4. Therefore, in step S3, the node D selects its local HO clock as the master clock. In the subsequent process of FIG. 6, the node D answers "YES" in step S21 and reaches step S23, thus transmitting a DUS message to both GP1 and GP2 lines.

The next slave transmission unit, node C, takes a path of "NO" in step S1, and "YES" in step S2 in the process of FIG. 4. Accordingly, the node C also selects its local HO clock as the master clock. In the subsequent process of FIG. 6, the node C reaches step S23 through a path of "NO" in step S21 and "YES" in step S22, thus transmitting a DUS message to both GP1 and GP2 lines.

FIG. 16(B) shows how the nodes B, C, and D will work after the node D and C completed their operations in FIG. 16(A). Serving as a slave transmission unit, the node B executes the process of FIGS. 4 and 5. It traces a path of "NO" in step S1, "NO" in step S2, "NO" in step S4, "NO" in step S9, and "YES" in step S10. Therefore, the node B selects its GP2 line in step S12. When executing the process of FIG. 6, the node B takes a path of "NO" in step S21, "NO" in step S22, and "NO" in step S24, thus reaching step S25. Here, the node B sends a DUS message to the selected GP2 line, while transmitting a G811 message to the non-selected GP1 line. The node B skips step S26, because the clock quality message timer has not been activated.

The other slave transmission units, node C and node D, execute the process of FIGS. 4 and 5. They will choose "NO" in step S1, "NO" in step S2, "NO" in step S4, "NO" in step S9, and "YES" in step S10. In step S12, the node C and D select their respective GP2 line as the reference clock source. In the subsequent process of FIG. 6, the nodes C and D take a path of "NO" in step S21, "NO" in step S22, and "NO" in step S24. They then execute step S25, thereby transmitting a DUS message to the selected GP2 line and a G811 clock quality message to the non-selected GP1 line. Step S26 is skipped, since the clock quality message timer has not been activated.

The above section clarified a recovery process from a link failure in a situation where two external clock sources have equal quality levels and the both are operational. As such, the nodes B, C, and D regain synchronization with the node A's EC3 clock source in this sequence, even if the link between the nodes A and D is disrupted. As a result, all the transmission units in the network can maintain the synchronization with a single external clock source.

Regarding the entries of a clock source list, recall that the transmission units without external clock sources has a blank entry with the lowest priority (PRI3). In such blank entries, a symbol "N" is registered to indicate that there is no clock source defined. As an alternative arrangement, another symbol "EXT" representing an external clock source can be registered in place of "N." Such slave transmission units have their own external clock input ports, which are just left unconnected. By configuring those ports to send "unconnected" messages, the clock selection controller can easily neglect a dummy "EXT" entry in the clock source list.

It should be noticed that the introduction of such dummy "EXT" entries will permit all the clock source list to have the uniform contents (i.e., GP1/GP2/EXT). This eliminates the need to maintain the clock source list in each transmission unit when setting up or reconfiguring the synchronous network. Since there is no chance to make any incorrect setup, the clock source lists will no longer cause disruption in clock distribution, while conventional systems sometimes run into trouble with it.

The above discussion is summarized as follows. According to the present the invention, each transmission unit employs a clock selection controller which establishes synchronization in a sequential manner, from the master transmission unit to the terminal slave unit in one direction along the ring. Particularly, the slave transmission units are designed to transmit, when it is in a terminal location, a DUS message to its neighboring master transmission unit so as to inhibit the master unit from selecting that line as a reference clock source. With this mechanism, the master transmission unit will not select a line clock provided from the terminal slave transmission unit, even if its external clock source has failed. In this way, the present invention prevents the clock distribution path from forming a closed timing loop.

Furthermore, each transmission unit has its clock source list that contains entries at least for two potential line clock sources provided from its neighboring transmission units. This feature enables all the transmission units in the network to synchronize themselves with a single external clock source, even when a problem has happened to a certain link connecting two transmission units.

Moreover, the present invention proposes that all the transmission units share the same contents of clock source lists. This eliminates the need to maintain the clock source list in each transmission unit, when setting up or reconfiguring the synchronous network. Since there remains no chance to make an incorrect setup, the clock source lists will never cause disruption in clock distribution, while conventional systems sometimes run into trouble with it.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A clock regeneration apparatus for regenerating and distributing a clock signal in a data transmission network that is organized by a plurality of transmission units linked in a ring topology, at least two of the plurality of transmission units each having an external clock source, the plurality of transmission units including a first transmission unit, and a second and third transmission units neighboring the first transmission unit, the clock regeneration apparatus being disposed in the first transmission unit and comprising:

clock source list memory means for storing a clock source list containing entries for a plurality of clock sources out of which the first transmission unit can select a reference clock source for synchronization, the plurality of clock sources having different priority levels for the selection, the plurality of clock sources including at least two line clock sources provided from the second and third transmission units;

master/slave data memory means for storing a master/slave mode flag indicating whether the first transmission unit serves as a master transmission unit that supplies the clock signal to the network or acting as a slave transmission unit that is supplied with the clock signal from the master transmission unit;

clock selection control means for selecting, from among the plurality of clock sources, a reference clock source with which the first transmission unit is to be synchronized, based on the clock source list, the master/slave mode flag stored in the master/slave data memory means, and clock quality messages that the first transmission unit have received from the second and third transmission units; and clock quality transmission means for supplying either one of the second and third transmission unit that is not selected as the reference clock source by said clock source selection control means, with a message requesting not to use a corresponding line clock source for synchronization, if the master/slave mode flag stored in said master/slave data memory means indicates that the first transmission unit is acting as a slave transmission unit, and if the clock quality messages received from the second and third transmission units exhibit equal clock quality levels continually for a predetermined period.

2. The clock regeneration apparatus according to claim 1, wherein an external clock source is locally connected to the first transmission unit, and the clock source list has an entry for the external clock source, whose priority level is lower than the priority levels of the two line clock sources provided from the second and third transmission units.

3. The clock regeneration apparatus according to claim 1, further comprising transmission means for supplying said either one of the second and third transmission units that is not selected as the reference clock source by said clock source selection control means, with a clock quality message containing information on the reference clock source selected by said clock source selection control means, during the predetermined period before said clock quality transmission means starts transmission of the message, if the master/slave mode flag stored in said master/slave data memory means indicates that the first transmission unit is acting as a slave transmission unit, and if the clock quality messages received from the second and third transmission units exhibit equal clock quality levels.

4. The clock regeneration apparatus according to claim 1, further comprising transmission means for supplying the second and third transmission units with the message requesting not to use the corresponding line clock sources for synchronization, if the master/slave mode flag stored in said master/slave data memory means indicates that the first transmission unit is acting as a slave transmission unit, and if the clock quality messages received from the second and third transmission units request not to use the corresponding line clock sources for synchronization.

* * * * *